United States Patent
Shimozono et al.

(10) Patent No.: US 7,613,877 B2
(45) Date of Patent: Nov. 3, 2009

(54) STORAGE SYSTEM COMPRISING VOLATILE CACHE MEMORY AND NONVOLATILE MEMORY

(75) Inventors: Norio Shimozono, Machida (JP); Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 372 days.

(21) Appl. No.: 11/610,072

(22) Filed: Dec. 13, 2006

(65) Prior Publication Data

US 2008/0104344 A1     May 1, 2008

(30) Foreign Application Priority Data

Oct. 25, 2006   (JP)   ............... 2006-289538

(51) Int. Cl.
    *G06F 12/00*    (2006.01)
(52) U.S. Cl. .................... 711/113; 711/136; 711/103
(58) Field of Classification Search .............. 711/113, 711/136, 103
    See application file for complete search history.

(56) References Cited

U.S. PATENT DOCUMENTS

| | | | |
|---|---|---|---|
| 5,519,831 A * | 5/1996 | Holzhammer | ................ 714/22 |
| 5,586,291 A | 12/1996 | Lasker et al. | |
| 6,539,456 B2 | 3/2003 | Stewart | |
| 6,990,603 B2 * | 1/2006 | Strasser | ......................... 714/6 |
| 2004/0064647 A1 | 4/2004 | DeWhitt et al. | |
| 2006/0020758 A1 * | 1/2006 | Wheeler et al. | ............. 711/137 |
| 2006/0080515 A1 * | 4/2006 | Spiers et al. | ................ 711/162 |

FOREIGN PATENT DOCUMENTS

| | | |
|---|---|---|
| JP | 04196000 | 7/1992 |
| JP | 6-222988 | 8/1994 |
| JP | 06309234 | 11/1994 |
| JP | 2002007373 | 1/2002 |
| JP | 2003091463 | 3/2003 |

* cited by examiner

*Primary Examiner*—Brian R Peugh
*Assistant Examiner*—Hashem Farrokh
(74) *Attorney, Agent, or Firm*—Brundidge & Stanger, P.C.

(57) ABSTRACT

A storage system comprises a volatile cache memory, and a non-volatile memory, which is a type of memory that can continue to memorize data irrespective of whether or not power is supplied. The temporary storage address of data following access commands from the upper level device shall be the volatile cache memory. If power is not supplied from primary power source to the volatile cache memory, power supplied from a battery is used to copy data memorized in volatile cache memory to non-volatile memory.

19 Claims, 24 Drawing Sheets

| PORT ID | LUN | LVOL ID |
|---------|-----|---------|
| S1a | 0 | L1 |
| S1a | 1 | L2 |
| S1a | 2 | — |
| ⋮ | ⋮ | ⋮ |
| S1b | 0 | L3 |
| S1b | 1 | FALSE |
| ⋮ | ⋮ | ⋮ |
| S1s | 0 | L1 |
| S1s | 1 | L2 |
| ⋮ | ⋮ | ⋮ |
| S1u | 0 | L4 |

| LVOL ID | PG ID | HEAD SLOT NUMBER |
|---------|-------|------------------|
| L1 | 0000 | 0x00000000 |
| L2 | 0000 | 0x00100000 |
| L3 | 0001 | 0x00000000 |
| L4 | 0001 | 0x00100000 |

STORAGE SYSTEM COMPRISING VOLATILE CACHE MEMORY AND NONVOLATILE MEMORY

CROSS-REFERENCE TO PRIOR APPLICATION

This application relates to and claims the benefit of priority from Japanese Patent Application number 2006-289538, filed on Oct. 25, 2006 the entire disclosure of which is incorporated herein by reference.

BACKGROUND

The present invention relates to a storage system.

Generally, storage systems comprise a cache memory. Cache memory is used to temporarily memorize data to be written to at least one of a plurality of storage devices in a storage system in accordance with a write command received from the upper level device, or data read from one of a plurality of storage devices in accordance with a read command.

Power supplied to the cache memory may be lost if the power source of the storage system fails. In this case, if the cache memory is volatile memory, the data memorized in the cache memory will be lost.

For example, disclosed in Literature 1 (U.S. Pat. No. 5,586,291) and Literature 2 (Japanese Patent Application Laid-open number H6-222988) respectively is the provision of non-volatile memory in addition to volatile cache memory, and the storage of data in non-volatile memory. Moreover, disclosed in Literature 3 (U.S. Pat. No. 6,539,456) and Literature 4 (US Patent Publication number 2004/64647) respectively is the utilization of non-volatile memory as cache memory.

Even though called non-volatile, the non-volatile memory disclosed in Literature 1 and Literature 2 is memory that can hold data by receiving power supplied from a battery. For that reason, the technology disclosed in this literature requires a battery in order to continue to hold data in non-volatile memory when the power source to the storage system fails.

Moreover, in literature 2 a redundant configuration is disclosed in which, when one system fails, the other system copies data memorized in non-volatile memory to a direct access storage device such as a tape or disk drive device. In addition, there is the risk that data may be lost if the other power source fails during that data copy. For this reason, power supplied from a battery is used to copy data from non-volatile memory to a direct access storage device. However, a large capacity battery that can continue to supply power for a long time is necessary because the access speed of direct access storage devices is slow.

Thus, the technology disclosed in literature 3 and literature 4 is applied to the storage system. Specifically, rather than volatile memory, this method makes the cache memory of the storage system into a type of non-volatile memory that can continue to memorize data even without power supplied from a battery.

However, this type of non-volatile memory generally tends to degrade with the number of update times (number of erase times). Even when non-volatile memory is used as cache memory in a small-scale device such as personal computers, updating may not cause much of a problem with shortening the lifespan of the non-volatile memory. However, in large-scale devices such as storage systems, updating cache memory occurs more frequently than in the small-scale devices described above, and therefore, the shortened lifespan corresponding to the number of update times is a problem.

SUMMARY

Consequently, an object of the present invention is to reduce the capacity of the battery required to back up the volatile cache memory.

Another object of the present invention is to control degradation of the non-volatile memory comprising the storage system.

A further object of the present invention will become clear in the subsequent description.

In addition to a volatile cache memory, a non-volatile memory is provided, which is memory of the type that can continue to memorize data irrespective of whether power is supplied. The volatile cache memory is mainly used, and the non-volatile memory is used in a supplementary manner.

Concretely, when the access control unit of the storage system processes an access command that the storage system has received from the upper level device, volatile cache memory is used as the memory that temporarily memorizes the data following the aforementioned access command. Specifically, if the access command is a write command, the access control unit temporarily memorizes the data into volatile cache memory following the write command, and then the memorized data is read from the aforementioned volatile cache memory and stored in at least one of a plurality of storage devices. If the access command is a read command, the data is read from at least one of a plurality of storage devices by the access control unit following the read command, and is temporarily memorized in volatile cache memory, and then the memorized data is read from the volatile cache memory and sent to the upper level device.

Then, the storage system comprises a cache data copy unit, and a battery, which is a secondary power source. If no power is supplied to the volatile cache memory from the primary power source, the cache data copy unit copies the data memorized in the volatile cache memory to the non-volatile memory using power supplied from the batter.

Here, "copy" means writing the same data as the data that is in a first memory area to a second memory area, and is not related to whether the data in the first memory area remains as is or is deleted.

The upper level device is an upper rank device above the storage system, and for example, can be another storage system of a host computer.

The storage system comprises a controller connected to a plurality of storage devices, and an access control unit, a cache data copy unit and a volatile cache memory can be mounted in the controller. The controller can be configured by one or a plurality of circuit boards. The controller, for example, may comprise a first I/F, which is a communication interface device connected with the upper level device, and a second I/F, which is a communication interface device connected with a plurality of storage devices. At least one of the first I/F and second I/F is, for example, a communication port, and is connected to the other through a dedicated line or a communication network.

A variety of non-volatile memory devices such as, for example, flash memory (specifically, for example, NAND-type flash memory), MRAM (Magnetoresistive Random Access Memory), and PRAM (Parameter Random Access Memory) may be adopted as the non-volatile memory. The non-volatile memory may be comprised by the controller, or by a storage device unit connected to the controller. The storage device unit may be comprised by the previously described plurality of storage devices.

The access control unit and the cache data copy unit may be structured by hardware, a computer program or a combination of these (for example, part executed by a computer program, and the rest executed by hardware). The computer program is read and executed by a microprocessor. Moreover, when data processing is executed by the microprocessor reading the computer program, a memory region of the memory present on the hardware resource may be suitably used. Moreover, the computer program may be installed on the computer from a memory medium such as a CD-ROM, or may be downloaded through a communication network.

BRIEF DESCRIPTION OF THE DRAWINGS

FIG. 4A indicates an example of a configuration of the LU configuration table;

FIG. 4B indicates an example of a configuration of the LVOL configuration table;

DESCRIPTION OF THE PREFERRED EMBODIMENTS

Several embodiments of the present invention will be explained below.

Embodiment 1

Figure 19:
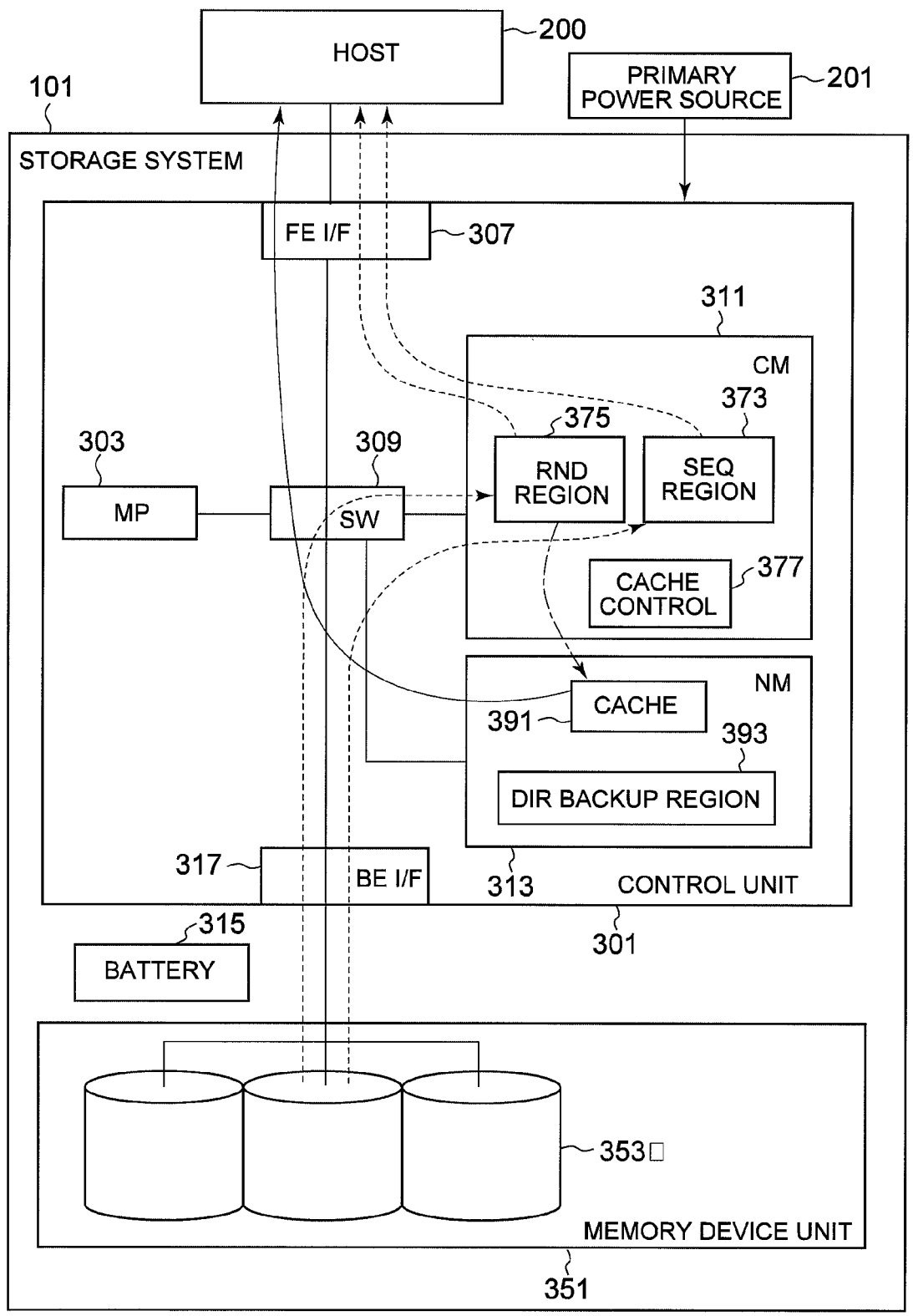
FIG. 19 indicates a summary of the computer system related to a first embodiment of the present invention, as well as a summary of the processing flow executed when a read command is issued from the host computer.

FIG. 19 indicates a summary of the computer system related to a first embodiment of the present invention, as well as a summary of the processing flow executed when a read command is issued from the host computer;

A storage system 101 comprises a controller 301, a storage device unit 351, and a battery 315.

The storage device unit 351 includes a plurality of storage devices 353. The plurality of storage devices 353 may all be storage devices of the same type, or may be a mix of differing types of storage devices. For example, the storage devices 353 may be a disk type storage device (for example, a hard disk drive (HDD), a DVD (Digital Versatile Disk) drive), a tape storage device (for example, a magnetic tape drive), or a flash memory device. One or a plurality of logical volumes may be provided based on the memory space of the plurality of storage devices 353. Two or more of the plurality of storage devices 353 may be configured by a RAID (Redundant Array of Independent (or Inexpensive) Disks) group, and logical volumes may be provided based on the memory space of the aforementioned RAID group. A volume identifier, for example, an LUN (Logical Unit Number) may be coordinated for each of the plurality of logical volumes.

The controller 301 comprises a front end I/F (hereinafter, FE I/F) 307, a back end I/F (hereinafter, BE I/F) 317, a cache memory (hereinafter, CM) 311, a non-volatile memory (hereinafter, NM) 313, a switch (hereinafter, SW) 309, and a microprocessor (hereinafter, MP) 303.

The FE I/F 307 is a communication interface device that is connected to and able to communicate with a host computer (hereinafter, host) 200, and is, for example, a communication port. The BE I/F 317 is a communication interface device that is connected to and able to communicate with a plurality of storage devices 353, and is, for example, a communication port.

The CM 311 is volatile memory, for example, DRAM (Dynamic Random Access Memory). The CM 311, for example, may comprise a plurality of sub-regions (hereinafter, CM sub-regions). Meanwhile, the NM 313 is, for example, FM (Flash Memory), and comprises a plurality of sub-regions (hereinafter, NM sub-regions).

The CM 311 can use a random region 375, a sequential region 373, and a cache control region 377. The random region 375 is a memory region that is configured by at least one CM sub-region where data to be written to the storage device 353 or read from the storage device 353 by random access (hereinafter, random access data) is memorized. The sequential region 373 is a memory region that is configured by at least one CM sub-region where data to be written to the storage device 353 or read from the storage device 353 by sequential access (hereinafter, sequential access data) is memorized. The cache control region 377 is a memory region configured by at least one CM sub-region, or a specified memory region that is used separately from the previously described plurality of CM sub-regions, and is where cache control information is memorized. Cache control information is information for controlling the data storage in relation to the CM 311 or the NM 313, and for example, for access address information comprises such information as sub-region address information (correspondence to location of sub-region), sub-region classification (for example, CM sub-region or NM sub-region), sub-region attribute (for example, clean, dirty, or free), and distance from LRU (Least Recently Used). The access address information described above may be a first type of access address information that is designated by an access command from the host 200 (for example, a combination of an LUN (Logical Unit Number) and a LBA (Logical Block Address)), or may be a second type of access address information that is acquired by converting the access address information designated by the aforementioned access command (for example, a combination of an identifier of the storage device 353 and a LBA). Sub-region attribute "clean" means a sub-region where data stored in the storage device 353 (clean data) is memorized. Sub-region attribute "dirty" means a sub-region where data not yet stored in the storage device 353 (dirty data) is memorized. Sub-region attribute "free" means a sub-region that is a candidate for a data storage address. Specifically, in the present embodiment, when data is stored in the CM 311, even if the data is stored in the NM 313, the MP 303 selects and temporarily stores the data in a sub-region with a sub-region attribute of "free" from among the plurality of sub-regions, and changes the sub-region attribute of that sub-region from "free" to "clean" or "dirty" depending on the classification of the data stored there. Moreover, in the present embodiment, the MP 303 may select and release a sub-region from the plurality of sub-regions that have a sub-region attribute of "clean", and the sub-region attribute of the selected sub-region is changed from "clean" to "free". In addition, the previously described "distance from LRU" can be specified in relation to the LRU pointer, for example, by connecting the entry corresponding to the sub-region to a cascade, and determining at what number the entry is from the LRU point. The shortest LRU distance is the LRU, and the longest distance from LRU means the MRU (Most Recently Used).

AN NM cache region 391, a cache control backup region 393 can be used by the NM 313. The NM cache region 391 is configured by at least one NM sub-region, and is the memory region taken to be the copy address of the data memorized in the CM 311 (different from the previously described cache control information). The cache control backup region 393 is a memory region configured by at least one NM sub-region, or is a specified memory region used separately from the aforementioned plurality of NM sub-regions, and is a memory region taken as the backup address (copy address) of the cache control information.

Connected to the SW 309 are the FE I/F 307, CM 311, NM 313, MP 303 and BE I/F 317. The SW 309 switches between element and element from among the plurality of elements connected thereto. The SW 309 may be, for example, realized by a LSI (Large Scale Integration). Other types of connecting mechanisms such as a bus may be adopted instead of the SW 309.

The MP 303 can process the read and write commands received by the FE I/F 307 from the host 200 by executing a specified computer program.

A summary of the processing flow executed when a read command is received will be explained below while referring to this FIG. 19. In FIG. 19, the dotted line arrow indicates the flow of data when the CM has a hit; the solid line arrow indicates the flow of data when the NM has a hit; and the chained line arrow indicates data copying from the CM 311 to the NM.

The MP 303 specifies the access address information from the read command, refers to the cache control information using that access address information, and searches for the CM sub-region corresponding to that access address information. If that CM sub-region is found (if the CM has a hit), the MP 303 reads from the CM sub-region that has been found, and transmits the data to the host 200. If that CM sub-region is not found (if the CM has a miss), the MP 303 refers to the cache control information using that access address information, and searches for the NM sub-region corresponding to that access address information. If that NM sub-region is found (if the NM has a hit), the MP 303 reads from the NM sub-region that has been found, and transmits the data to the host 200. If neither a CM sub-region nor an NM sub-region is found (the CM and NM both have misses), the MP 303 reads data from the places at the plurality of storage devices 353 that correspond to that access address information, and the read data is temporarily stored in a "free" CM sub-region. The MP 303 sets the sub-region attribute of that CM sub-region to "clean", and the stored data is read from that CM sub-region and is transmitted to the host 200.

Moreover, the MP 303 determines whether the read following the aforementioned read command is sequential access or random access. If determined to be sequential access, the MP 303 attributes the aforementioned CM sub-region with the temporary data storage address to the sequential region 373, and if determined to be random access, attributes that CM sub-region to the random region 375.

Moreover, MP 303 can copy the data on the CM 311 to the NM 313 by suitably executing the specified computer program. Concretely, for example, by referring to the cache control information, the MP 303 specifies the CM sub-region, which is attributed to the random region 375, has a sub-region attribute of "clean", and is the LRU, and also specifies an NM sub-region that has a sub-region attribute of "free" (if none, for example, NM sub-region that has a sub-region attribute of "clean" is made "free"). The MP 303 copies the clean data within the specified CM sub-region to the specified NM sub-region. This data copy may be executed by the MP 303, or by DMA (Direct Memory Access).

Figure 20:
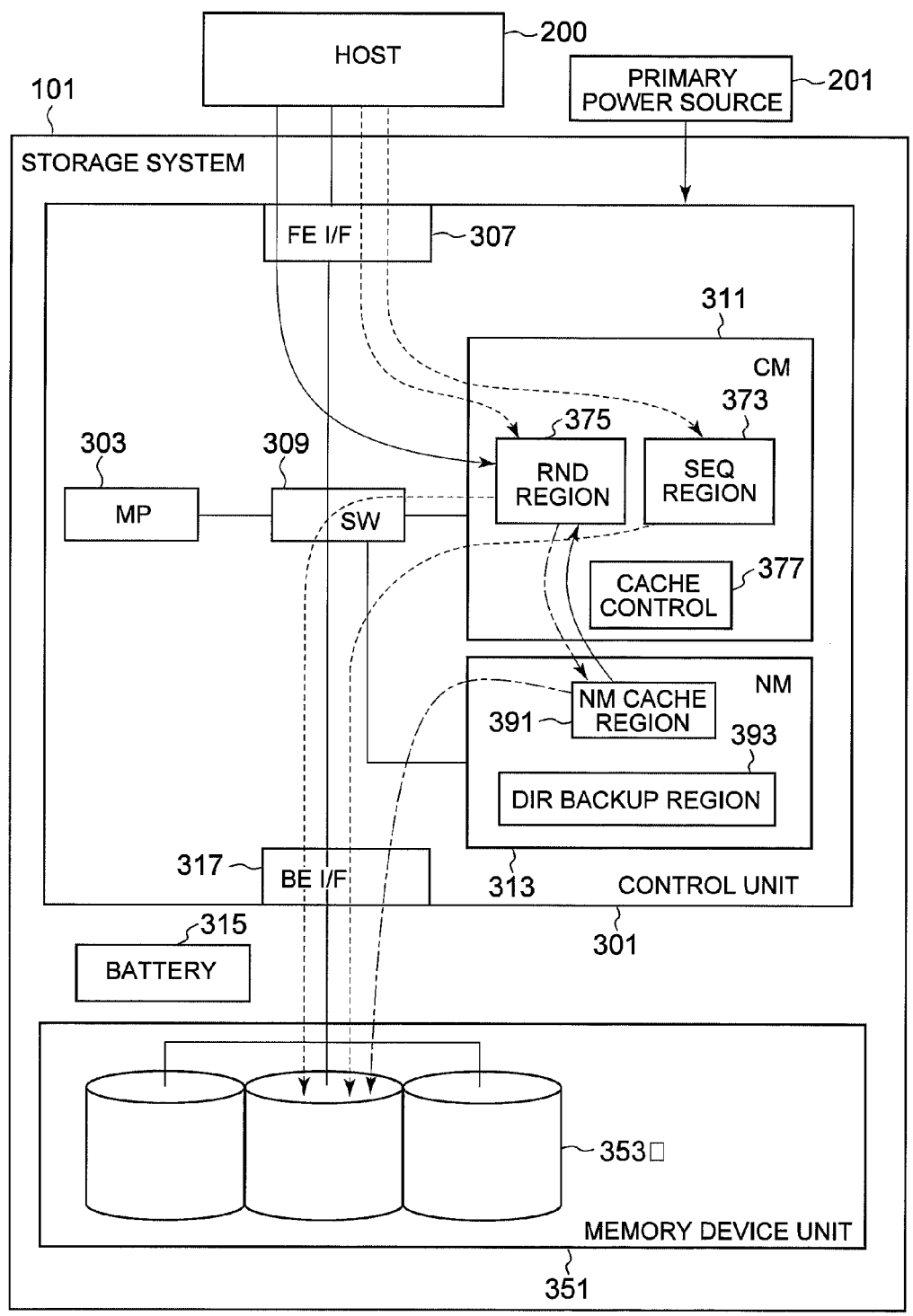
FIG. 20 indicates a summary of the processing flow executed when a write command is issued from the host computer.

Next, a summary of the processing flow executed when the FE I/F 307 receives a write command will be explained while referring to FIG. 20. In FIG. 20, the dotted line arrow indicates the flow of data when the CM has a hit; the solid line arrow indicates the flow of data when the NM has a hit; and the chained line arrow indicates data flow when the CM 311 has an excess load.

The MP 303 specifies the access address information from the write command, refers to the cache control information using that access address information, and searches for the CM sub-region corresponding to that access address information. If that CM sub-region is found (if the CM has a hit), the MP 303 stores the data in the CM sub-region that has been found following the write command. If that CM sub-region is not found (if the CM has a miss), the MP 303 refers to the cache control information using that access address information, and searches for the NM sub-region corresponding to that access address information. If that NM sub-region is found (if the NM has a hit), the MP 303 refers to the cache control information specifies a CM sub-region having a sub-region attribute of "free", and copies the data from the found NM sub-region to the specified CM sub-region. Then the MP 303 stores the data at that CM sub-region following that write command.

Moreover, the MP 303 determines when the writing following the aforementioned write command is sequential access or random access. If determined to be sequential access, the MP 303 attributes the aforementioned CM sub-region with the temporary data storage address to the sequential region 373, and if determined to be random access, attributes that CM sub-region to the random region 375.

In principle, the MP 303 copies data within a CM sub-region, which is attributed to random region 375 and has a sub-region attribute of "clean", but as an exception, if the CM 311 has an excess load, the data within a CM sub-region that is attributed to the random region 375 and has a sub-region attribute of "dirty" is copied to the NM cache region 391 of the NM 391. The CM 311 has an excess load, for example, when there is no CM sub-region with a sub-region attribute of "clean" or "free", and there is only a CM sub-region with a sub-region attribute of "dirty". In this case, for example, the MP 303 refers to the cache control information, and specifies a CM sub-region, which is attributed to the random region 375, has a sub-region attribute of "dirty", and is the LRU, and specifies an NM sub-region that has a sub-region attribute of "free" (if none, then a "clean" NM sub-region is set to "free"). The MP 303 copies the dirty data within the specified CM sub-region to the specified NM sub-region. This data copy may be executed by the MP 303, or by DMA (Direct Memory Access). The MP 303 can copy the NM 313 dirty data to the storage device 353. In the explanation of the present embodiment, storing data memorized in the CM 311 or NM 313 into the storage device 353 is called "destage" below.

Figure 21:
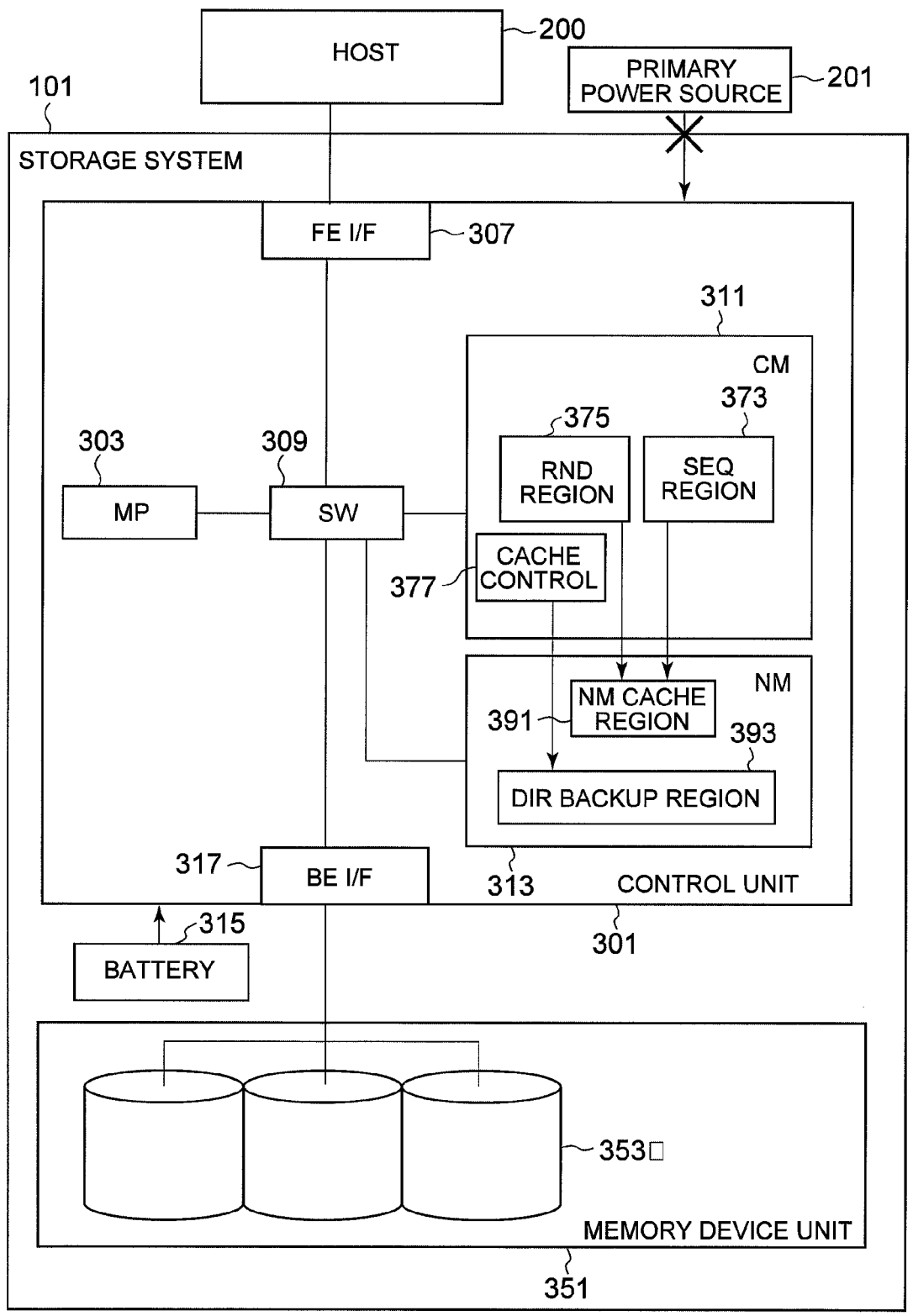
FIG. 21 indicates a summary of the processing flow executed when no power is supplied to the cache memory from the primary power source.

Next, while referring to FIG. 21, an explanation will be given summarizing the processing flow executed when there is no power supplied from the primary power source 201 and the controller 301 can only operate from power supplied from the battery 315.

In this case, the data on the CM 311 is backed up to the NM cache region 391. Moreover, the cache control information on the cache control region 377 is backed up to the cache control backup region 393. These backups may be executed by the MP 303 or by the DMA.

Further, in backing up the data, clean data backup is not necessary. This is because even if the clean data on the CM 311 is deleted, that data is maintained on the storage device 353.

Thus, if no power is supplied from the primary power source 201, the MP 303 is supplied power from the battery 315, and can operate in the following manner. Concretely, for example, the MP 303 refers to the cache control information, specifies a CM sub-region having a sub-region attribute of "dirty", and backs up the dirty data within the specified CM sub-region to the NM cache region 391. Dirty data is backed up without reference to whether it is random access data or sequential access data. Moreover, regarding the cache control information, MP 303 may back up all of the cache control information to cache control backup region 393, or the MP 303 may select the parts which control the CM and NM sub-regions for sub-region attributes of "dirty", and back up the selected parts to the cache control backup region 393.

This first embodiment will be explained in detail below.

Figure 1:
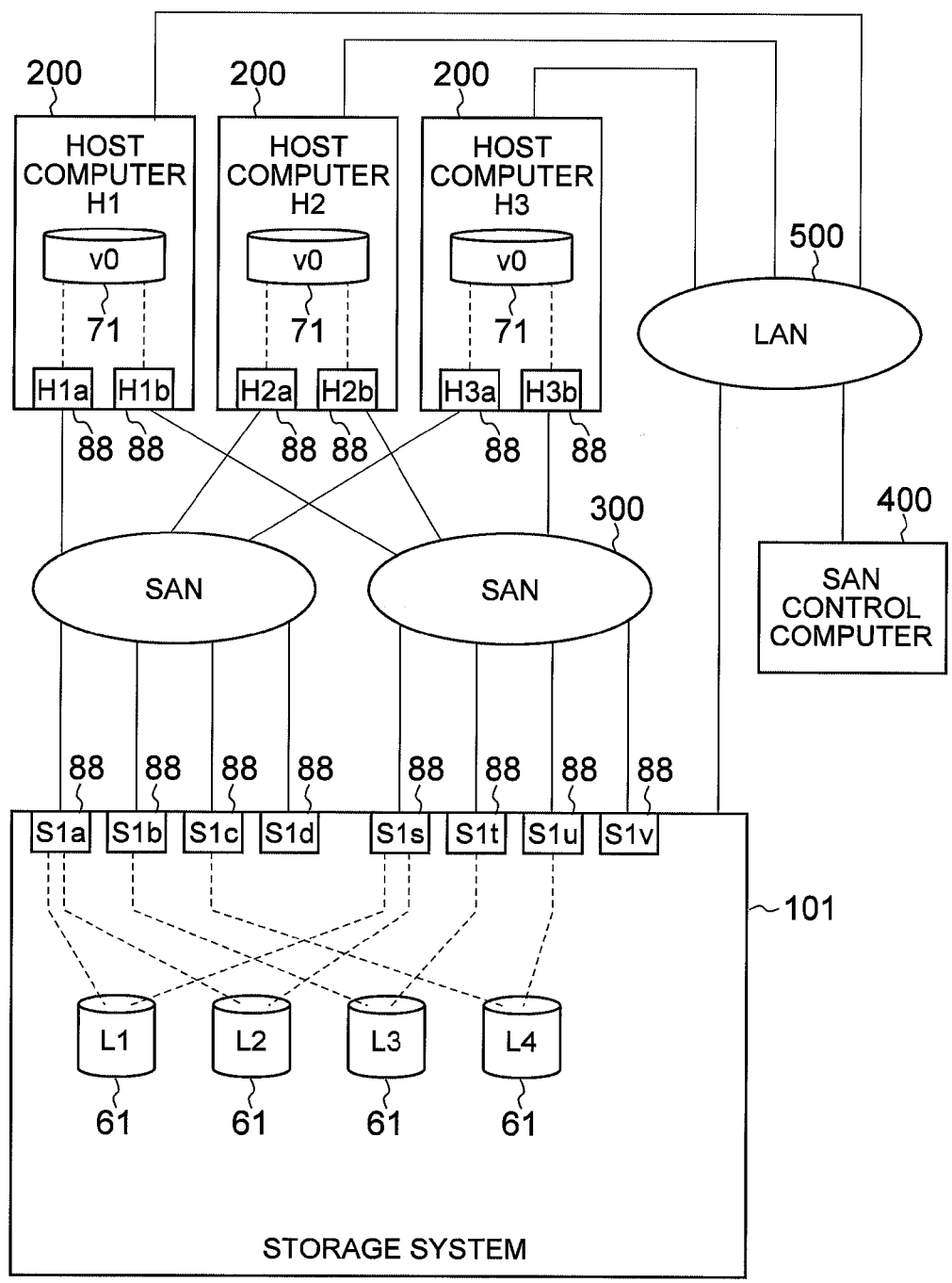
FIG. 1 indicates an example of a configuration of a computer system related to a first embodiment of the present invention.

FIG. 1 indicates an example of a configuration of a computer system related to a first embodiment of the present invention.

In this computer system, there are one or more storage systems 101, one or more host computers 200, and a SAN (Storage Area Network) control computer (for convenience, called a "control server" hereinafter) 400.

The storage system 101 and host 200 have one or more SAN ports 88. Each SAN port 88 is connected to a SAN 300 (concretely, for example, SAN switch that is a configurational element of the SAN 300). The storage system 101 and host 200 use a protocol called, for example, a FCP (Fiber Channel Protocol), and can transceive commands and data.

Moreover, the storage system 101, the host 200, and the control server 400 are connected to a LAN (Local Area Network) 500. The control server 400 can communicate with the host 200 and a storage system 1010 via the LAN 500.

Further, in the form of the present example, the type of SAN interface and protocol used between the storage system 101 and host 200 is not particularly limited. For example, another combination of interface and protocol, such as Ethernet® and iSCSI (Internet Small Computer System Interface) may be used together. Moreover, a LAN was connected between the storage system 101 and the control server 400, but this is nothing more than an example, and another interface may also be used.

The host 200 is a computer that executes any application such as a database, and inputs/outputs the data necessary for the related processing in relation to the storage system 101.

The storage system 101 is a system that provides the host 200 with one or more logical memory regions (called logical volume or LVOL hereinafter) 61. When the host 200 sends a SCSI command to the storage system 101, the storage system 101 follows the applicable command, and transfers data to and from the host 200. The data transferred from the host 200 is stored in at least one of the previously described plurality of storage devices 353. Concretely, for example, that transferred data is stored in a parity group (called PG hereinafter), is configured by four storage devices (for example, hard disk drives) 353, which are physical memory regions corresponding to each logical volume 61. The parity group is sometimes called a RAID group or an array group.

Further, the logical volume 61 may be any of various types of logical volumes. Concretely, for example, the-logical volume 61 may be: a logical volume in which the physical memory regions are individually allotted from the parity group; a virtual logical volume in which the memory region is automatically allocated from the parity group (hereinafter, called an automatic capacity expansion volume); a logical volume that stores the control instructions based on the commands from the host 200 and the mode modification instruction of the automatic capacity expansion volume; or a logical volume that corresponds to a logical volume within another storage system not indicated in the diagram (hereinafter, an externally connected volume). In regard to automatic capacity expansion, technology disclosed in, for example, Japan Patent Application Laid-open number 2003-15915 (U.S. Pat. Nos. 6,725,328, 6,836,819, and U.S. patent application Ser. No. 10/991421) may be adopted. In regard to external connection, technology disclosed in, for example, Japan Patent Application Laid-open No. 2005-107645 (U.S. patent application Ser. No. 10/769805, U.S. patent application Ser. No. 11/471556) may be adopted.

When using FCP, the host 200, for example, can designate a logical volume 61 by adding a port address and an LUN (Logical Unit Number) to a command header in order to designate the SAN port 88 of the storage system 101, and issuing the command to the storage system 101. In addition, the command comprises, for example, a command code that indicates whether the type of command is read or write, an address that indicates the position within the logical volume 61 at which transfer begins, and the transfer length information.

If a SCSI command is received, for example, the storage system 101 specifies the logical volume 61 from SAN port 88 and the LUN the based on the information set up in the applicable SCSI command, and transfers the data. In the present embodiment, it is not always necessary to set one or more logical volumes 61 to each SAN port 88, and one or more unused SAN ports 88 to which no logical volume 61 has been set may be used at the time of initial set up. In FIG. 1, Sld, Slv are unused SAN ports 88.

Further, to heighten SAN reliability, as indicated in the diagram, the storage system 101 and the hosts 200 are connected by a plurality of SAN ports 88 and SAN 300, and there may be redundant access routes from the host 200 to the logical volumes 61 by having a combination of a plurality of SAN ports 88 and LUN correspond to the same logical volume 61.

Because the access routes to the duplex logical volumes 61 (for example, combinations of port addresses and LUN) are virtual, the host 200 can control the memory region in units called host volumes 71 (hereinafter, HVOL). When the application accesses a host volume 71, the host 200 can send the corresponding logical volume 61 SCSI command to the storage system 101.

Figure 2:
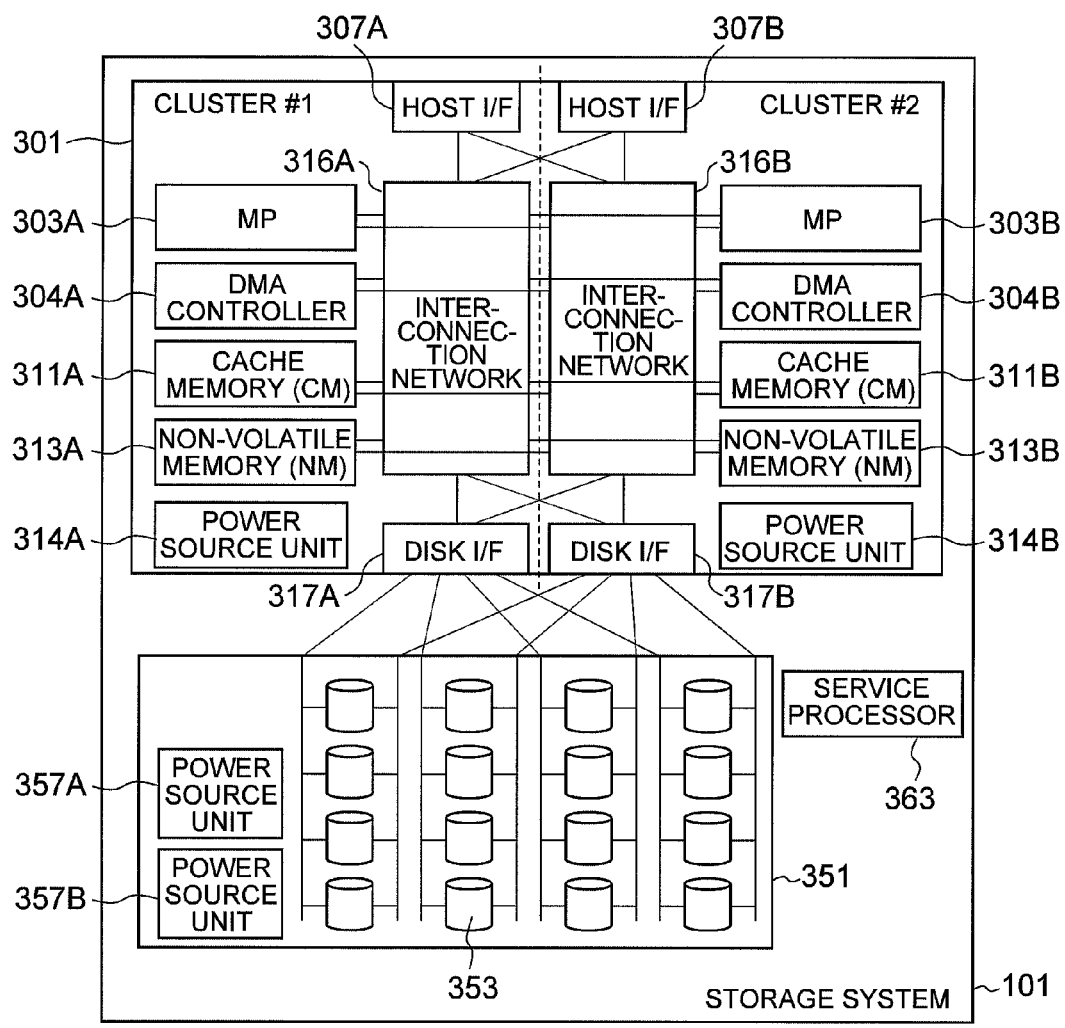
FIG. 2 indicates an example of a configuration of a storage system 101.

FIG. 2 indicates an example of a configuration of the storage system 101.

The storage system 101 can be broadly divided into the controller 301 and the storage device units 351. Moreover, the storage system 101 can also comprise a service processor (SVP) 363 for maintaining or controlling this storage system 101. The service processor 363 is, for example, a computer (concretely, for example, a notebook personal computer), and can execute a variety of processing such as setting up the respective MP 303A and 303B configurational information, and setting up information for the processor to communicate with the control server 400.

The controller 301 is configured by a duplex cluster (may also be multiplex, and is not limited to duplex). When one cluster fails, the other cluster can conduct degeneration operations. The hardware configuration of both clusters may be substantially the same. For this reason, one cluster (the cluster indicated by cluster #1 in FIG. 2) will be adopted as an example in the explanation.

One cluster comprises a host I/F 307A, a MP 303A, a DMA controller 304A, a CM 311A, an NM 313A, a disk I/F 317A, an interconnection network 316A, and a power source unit 314A. The numbers of host I/F 307A and 307B, and disk I/F 317A and 317B may, for example, be increased and/or reduced corresponding to the necessary number of ports within the permissible range of connectivity of the interconnection network. Moreover, at least one member of the MP 303A, 303B, CM 311A, 311B, NM 313A, 313B, and DMA controllers 304A, 304B may be increased and/or reduced corresponding to the required performance.

The host I/F 307A is, for example, equivalent to the previously described FE I/F 307, and the disk I/F 317A is, for example, equivalent to the previously described BE I/F 317. The DMA controller 304A transfers data between the CM 311A and the NM 313A.

The interconnection network 316A is, for example, equivalent to the previously described SW 309. The interconnection network 316A may be another type of connecting unit such as a bus. Not only are the host I/F 307A, MP 303A, DMA controller 304A, CM 311A, NM 313A and disk I/F 317A of one cluster connected to the interconnection network 316A, but are also connected to the host I/F 307B, MP 303B, DMA controller 304B, CM 311B, NM 313B, and disk I/F 317B of the other cluster. For this reason, for example, the MP 301A can access the CM 311A and NM 313A of one cluster through the interconnection network 316A, and can access the CM 311B and NM 313B of the other cluster through the other interconnection network 316B. Moreover, the various storage devices 353 are connected to both disk I/F 317A and 317B, therefore can access any storage device 353 relayed through either disk I/F 317A or 317B. Specifically, in this storage system 101, every member and the access route to the storage devices 353 has a redundant configuration in order to improve.

The power source unit 314A supplies power to every member of one cluster. The power source unit 314A includes, for example, a power source circuit that supplies power from a commercial power source to each member, and a battery that supplies power to specified members (for example, MP 303A, CM 311A) if the power source circuit fails. If there is a failure of the primary power source such as, for example, a black out, the battery is taken as a secondary power source, and can, for example, prevent loss of data from the CM 311A by supplying power to the CM 311A. Further, in FIG. 2, the dotted line drawn in the center of the controller 301 means a power source boundary. Specifically, this means that the MP 303A can access the CM 311A and NM 313A of one cluster as well as the CM 311B and NM 313B of the other cluster, but power supplied from the power source unit 314A of one side is supplied to all the members of one cluster, but is not supplied to the members of the other cluster.

As previously described, storage device unit 351 comprises a plurality of storage devices 353, and each storage device 353 is connected to and communicates with the disk I/F 317A and 317B of either side. Moreover, the storage device unit 351 has power source units 357A and 357B that supply power to the various storage devices 353. Moreover, the power source units 357A and 357B have a redundant configuration, and if the power source unit 357A of one side fails, the storage devices 353 can be supplied power from the source unit 357B of the other side.

For example, the following takes place with the storage system 101.

The power source units 357A and 357B of the storage device units 351 are, for example, duplicated in case of a breakdown (or are redundant in triplicate or more), but batteries do not need to be included in every power source unit.

As previously described, the NM 313A and 313B are the type of memory that can continue to maintain data even if power is not supplied from a battery, or the like. If the primary power source does not fail (during normal use, for example), the NM 313A and 313B can be used as cache in the same way the CM 311A and 311B. If the CM 311A of one side fails (for example, the CM 311A itself breaks down or the primary power source on one side fails), the NM 313A can be used as the backup address of the dirty data during primary power source failure.

The NM 313A and 313B have a lifespan. Concretely, for example, if the number of times of updating NM exceeded the threshold value (for example, the guaranteed number of times rated by the manufacturer of the NM), the data in the NM may be lost. The access speed of the NM 313A and 313B is slower than that of the CM 311A and 311B, but is higher than that of the storage device 353. The access speed of the NM 313A and 313B may also be faster for reading than for writing.

Moreover, copying data from the CM 311A to the NM 311A (and/or NM 311B), and copying data from the NM 311A (and/or NM 311B) to the CM 311A may be conducted by the MP 303A (and/or MP 303B), but can also be conducted by the DMA controller 304A (and/or DMA 304B).

In addition, NM 313A and 313B are connected to the interconnection network 316A and 316B, but are not limited to that. For example, an NM device (for example, a flash memory device) having an interface for communicating with disk I/F 317A and 317B may be mounted in the storage device unit 351, and may communicate with the MP 303A and 303B through the disk I/F 317A and 317B. In that case, the power source units 357A and 357B also must have a battery.

Figure 3:
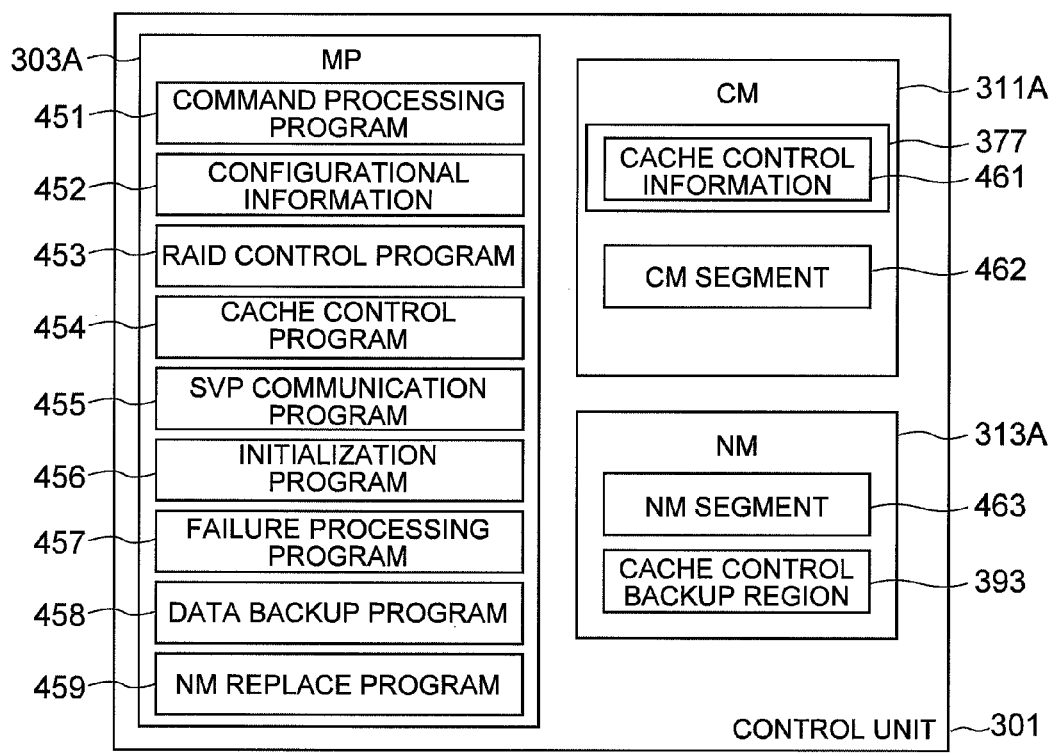
FIG. 3 indicates an example of the logical configuration of the controller 301.

FIG. 3 indicates an example of the logical configuration of the controller 301. In this FIG. 3 the configuration of one cluster is indicated as representative.

The MP 303A executes a computer program read from the memory region on the controller 301. Moreover, the MP 303A can acquire the configuration information 452 from the aforementioned memory region. Computer programs include, for example, command processing program 451, RAID control program 453, cache control program 454, SVP communication program 455, initialization program 456, failure processing program 457, data backup program 458, and NM replace program 459. The various programs and configuration information 452 will be explained below. When a computer program is the subject of the explanation, that processing is executed by the MP that actually executes that computer program.

The command processing program 451 processes the SCSI commands that the host I/F 307A receives.

The configuration information 452 is information that expresses the correlative relationship between the logical volume 61 shown on the host 200 and the parity group. The configuration information 452, for example, comprises a LU configuration table, and a LVOL configuration table. These tables will be described later.

The RAID control program 453 stages from the parity group to the CM 311A (reads data from the storage device 353 to the CM 311A), and destages dirty data of the CM 311A or NM 313A to the parity group.

The cache control program 454 executes processing to manipulate the cache control information 461, and to control the form of the CM segment (CM 311A sub-region). This program 454, for example, is called up from the command processing program 451 and the RAID control program 453.

The SVP communication program 455 communicates with the SVP 363. This program 455, for example, executes processing that sets up the configuration information 452 that was input from the SVP 363. The SVP 363 may be capable of stand alone operation (for example, an apparatus mounted with a display device or input device (for example, a keyboard)), or may have configuration information 452 input by following the commands from the control server 400. The SVP communication program 455 can notify the SVP 363 of information (failure information) representing a failure detected by the failure processing program 457. The SVP 363 can notify the control server 400 of the failure information notification.

The initialization processing program 456 conducts the specified initialization processing, for example, various types of queue initialization to be described later.

The failure processing program 457 is called up periodically, or on the occasion when another computer program has generated an error. The failure processing program 457 detects failures by checking the various members, and executes suitable failure processing. This program 457, for example, can call up the data backup program 458 if a primary power source failure is detected.

If the primary power source fails (for example, if called up from the failure processing program 457), the data backup program 458 backs up the dirty data on the CM 311A to the NM 313A.

The NM replace program 459 conducts processing for copying data from the CM 311A to the NM 313A.

The CM 311A has a cache control region 377 where the cache control information 461 is stored. In addition, the CM 311A has a plurality of CM segments 462.

The cache control information 461 is information for executing cache control processing. For example, this information 461 comprises slot control blocks, cache directories, clean queues, dirty queues, and free queues.

The CM segments 462 are one type of the previously described CM sub-regions. In other words, control is possible by allocating the CM 311A into fixed length segments. The CM segment size is optional (for example, set to 4 kB (kilobytes)).

The NM 313A has a cache control backup region 393, as previously stated. In addition, the NM 313A has a plurality of NM segments 463. The NM segments 463 are one type of the previously described NM sub-regions. In other words, control is possible by allocating the NM 313A into fixed length segments. Data stored in the CM segments 462 can be stored in the NM segments 463. For that purpose, the NM segment size can be made the same as the CM segment size. Alternatively, for example, in addition to data, specified types of control information may be stored in the NM segments. In this case, it is possible to make the NM segment size be a value that adds the size of the control information to be stored to the CM segment size (may also be a value different than that).

FIG. 4A indicates an example of a configuration of a LU configuration table. Below, identifier is abbreviated as "ID".

The LU configuration table 452-1 is a table for determining the LVOL IDs corresponding to the LUNs of the various SAN ports. Concretely, for example, for every SAN port 88 of the host I/F 307A and 307B in the LU configuration table 452 there is a corresponding port ID, LUN (logic unit number), and LVOL ID. Here, the LU means the logical volume identified from the host 200, and in contrast, the LVOL means the logical volume identified in the storage system 101. For example, even if a LVOL has a 1 to 1 correspondence with the LU, one LU may have a plurality of LVOLs.

There may be multiple tables 452-1. In this case, the host 200 may map the same LUN to different LVOL IDs.

FIG. 4B indicates an example of a configuration of a LVOL configuration table.

The LVOL configuration table 452-2 is a table for determining the actual entity of the LVOL (data storage address). Concretely, for example, in the LVOL configuration table 452-2 there is a LVOL ID, PG ID, and head slot number corresponding to every LVOL. In addition, other types of information elements, for example, the LVOL volume may also be written. The PG ID is the parity group ID.

The parity group may be allocated to the LVOL in volume units such as slots. For that purpose, the volume of the LVOL may be expressed, for example, in the number of slots. The slot size may be taken as 4 kB (kilobytes), but is not limited thereby, and other sizes may be adopted.

FIG. 5 indicates an example of a configuration of the cache control information 461.

Figure 5A:
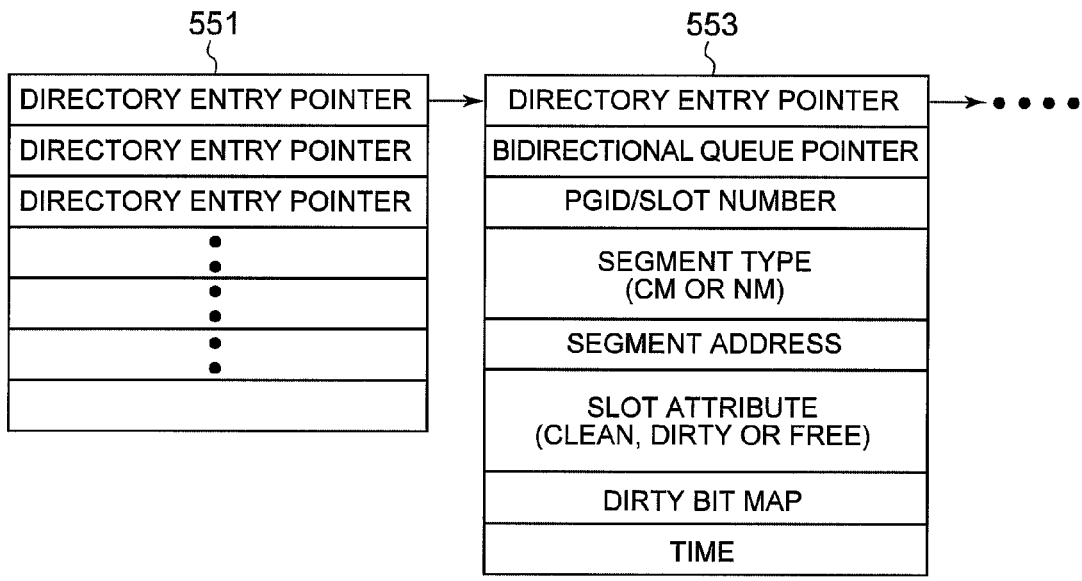
FIG. 5A indicates one example of the cache directory control structure.

Concretely, FIG. 5A indicates one example of a cache directory control structure.

The cache directory control structure indicated in FIG. 5A is a data structure for searching for a directory entry 553 based on a combination of the PG ID and the slot number (below, PG ID/slot number).

There is a hash table 551. A plurality of directory entry pointers is included in the hash table 551. The directory entry pointers recorded in this hash table 551 represent information that specifies a directory entry 553, for example, an address value on the CM. The directory entry pointers of the hash table 551 indicate the heads of unilateral lists comprising a directory entry 553 which is mutually equivalent to the PG ID/slot number hash. The PG ID/slot number may be compressed in other systems.

In this embodiment, address information designated by a SCSI command from the host 200 (for example, a combination an LUN and an LBA) is used; the LVOL ID is specified by referring to the configuration information 452; and the PG ID/slot number can be specified from the applicable specified LVOL ID and LBA. Then, the directory entry point is derived by hashing the PG ID/slot number, and the directory entry 553 can be specified from the directory entry pointer.

The directory entry 553 is information corresponding to a CM segment 462 or an NM segment 463. Multiple types of information elements may be described by a directory entry 553. For example, included are: the directory entry pointer, a bidirectional queue pointer, the PG ID/slot number, a segment classification, a segment address, a slot attribute, a dirty bitmap and a time. The bidirectional queue pointer is a value expressing whether the directory entry 553 is logically linked with any other entries in the LRU control structure, and has two pointers for the purpose of bidirectional correspondence. When two other directory entries 553 are logically linked to this directory entry 553, it is possible to specify which is closest to the LRU side from this bidirectional queue pointer and which is closest to the MRU side. The segment classification expresses, for example, whether the segment is a CM segment or an NM segment. The segment address expresses the location of the segment. The slot attribute expresses the segment attribute (dirty, clean, free) corresponding to the slot. The dirty bitmap is a collection of bits corresponding to various regions when, for example, a segment corresponding to a slot has been divided into a plurality of regions. A bit corresponding to a region where there is dirty data shall be valid (for example, 1), and a bit corresponding to a region that is not so shall be invalid (for example, 0). The time recorded in the directory entry 553 expresses the time at queue transition, which will be described later.

In the present embodiment, in order to simplify the explanation, the slot size and the CM segment size shall be the same. However, the embodiment is not limited thereby, and if the slot size is N times (N is an integer of two or more) the CM segment size, the ordinal number of the segment in the slot is added to the PG ID/slot number and is recorded in the directory entry 553. When determining hit or miss, a hit is when the PG ID/slot number and that segment number agree.

Moreover, the previously described dirty bitmap is used, for example, when the write unit size in the write command from the host 200 does not agree with the segment size. Concretely, for example, if the segment size is M times (M is an integer of two or more) the write unit size, a collection of M bits for one segment can configure the dirty bitmap. With SCSI, for example, the access (I/O) minimum unit from the host 200 is 512 bytes, and therefore, if the segment size is 4 kB, then 4 kB/512 B=8 bits.

Figure 5B:
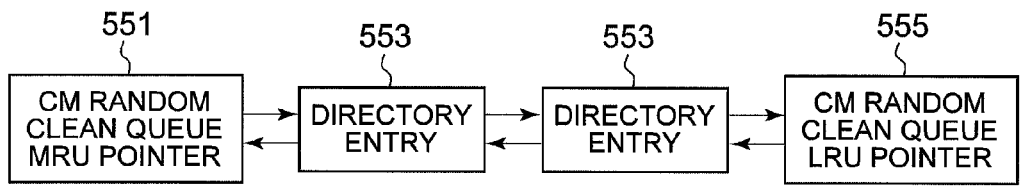
FIG. 5B indicates one example of the LRU control structure.

FIG. 5B indicates one example of the LRU control structure.

This FIG. 5B indicates a CM random clean LRU control structure. LRU control can be executed in a queue. Specifically, this is a structure for controlling the LRU of random data (randomly accessed data) that is also clean data in the CM 311A. Data within the CM segment specified from the directory entry 553 linked to the LRU pointer 557 of the CM random clean queue indicates the LRU, specifically, the data used longest ago of all the random data that is also clean data present in the CM 311A. Conversely, data within the CM segment specified from the directory entry 553 linked to the MRU pointer 555 of the CM random clean queue indicates the MRU, specifically, the most recently used data. Every time that 311A data is used (accessed) anew, the directory entry 553 corresponding to that use is inserted between the MRU pointer 555 and directory entry 553 linked thereto.

This FIG. 5B is the structure for CM random clean LRU control, but by using the same structure, it is possible to execute LRU control respectively of CM sequential clean (sequential data that is also clean data in the CM 311A), CM random dirty (random data that is also dirty data in the CM 311A), CM sequential dirty (sequential data that is also dirty data in the CM 311A), NM clean (clean data in the NM 313A), and NM dirty (dirty data in the NM 313A). Further, the NM dirty LRU control structure is used when a failure occurs (for example, when the CM 311A has an excess load, or when the primary power source fails and dirty data is backed up from the CM 311A to the NM 313A)

Figure 5C:
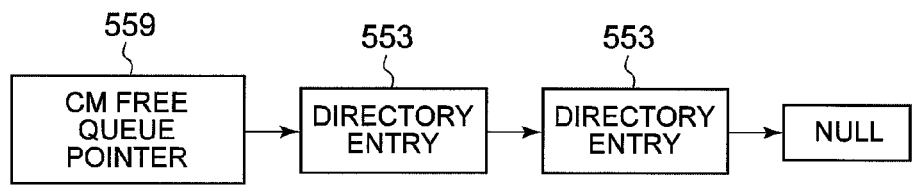
FIG. 5C indicates the free control structure.

FIG. 5C indicates the free control structure.

This FIG. 5C indicates the structure for controlling CM free (directory entries having a slot attribute of "free"). This control can be executed in a queue. In CM free control, a directory entry having a slot attribute of "free" (specifically, a "free" CM segment) may be controlled, and because it is not necessary to control the LRU, only one of the two pointers included in the bidirectional queue pointer is used (the other pointer, for example, is set to a value that means invalid). One or more CM free directory entries 553 are linked from the CM free queue pointer 559. A value that means the end (for example, NULL) is linked to the final directory entry 553 of this linked structure.

The same free control structure can be used for NM free control.

Further, in the above cache control information 461, for example, in the initial state all of the directory entries 553 that correspond to the CM segment 462 are entered in the CM free queue, and those that correspond to the NM segment 463 are entered in the NM free queue. Concretely, for example, as one initialization process, the initialization program 456 sets the segment classification and segment address to the various directory entries 553, and processing is executed that registers the segments to the free queue that corresponds to the segment classification.

The several processing flows executed by this first embodiment will be explained below.

Figure 6:
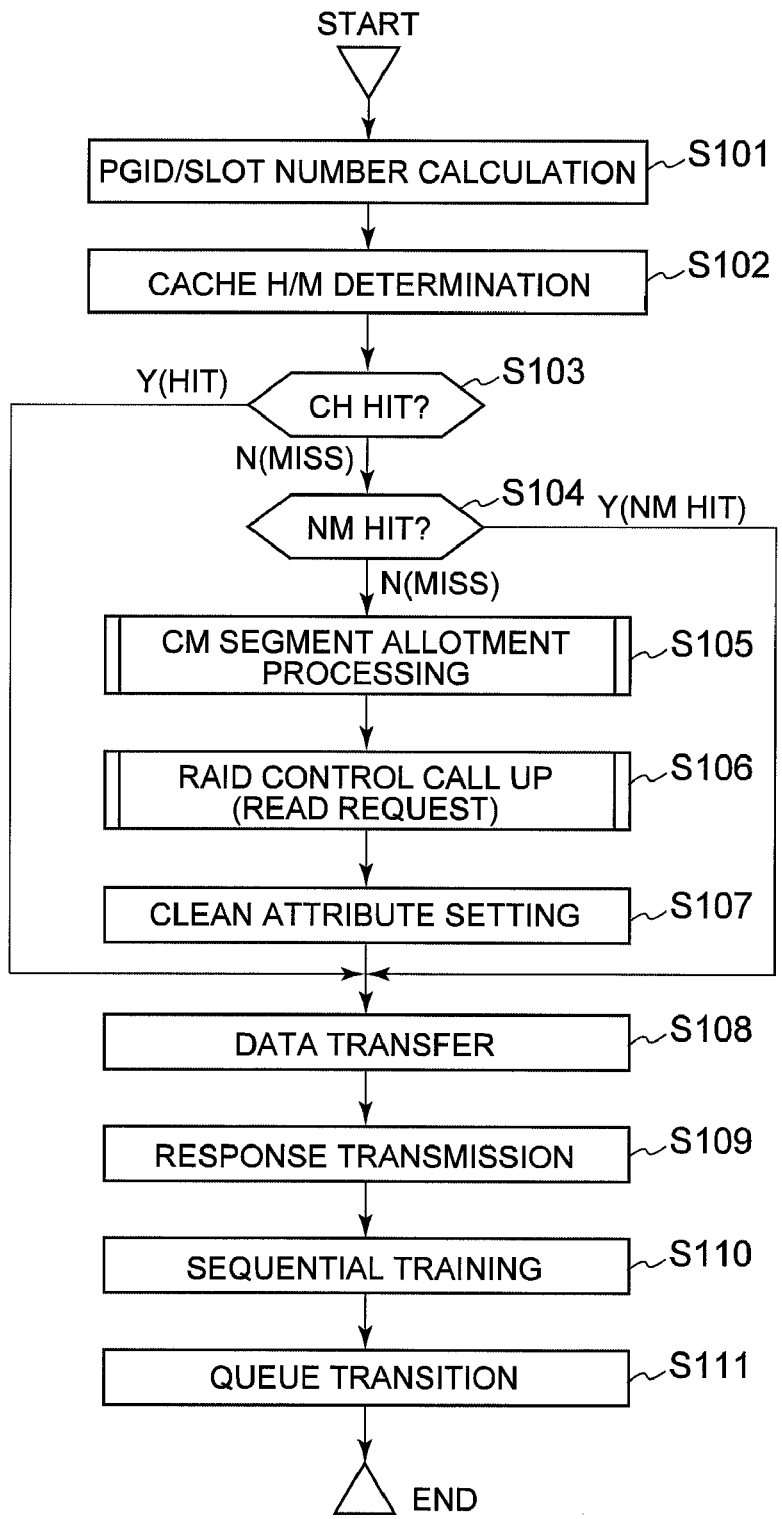
FIG. 6 indicates one example of the processing flow executed when a read command has been received by the host I/F.

FIG. 6 indicates one example of the processing flow executed when a read command is received by the host I/F. In the figures, "S" is short for step.

At step 101, the command processing program 451 calculates the PG ID/slot number from the access address information (for example, the LUN and LBA) designated by the read command.

At step 102, the command processing program 451 determines a cache hit/miss. Concretely, for example, command processing program 451 determines whether or not there is a directory entry 553 corresponding to the calculated PG ID/slot number. In this determination, for example, the command processing program 451 refers to the CM related queue at this address, and if the CM misses, the NM related queue is then searched. The CM is mainly used. It may be expected that this determination (step 102) will thereby be completed in a short time.

In the determination at step 102, a corresponding directory entry 553 with a segment classification of CM constitutes a CM hit, and therefore the value is YES at step 103, and the flow progresses to step 108. A corresponding directory entry 553 with a segment classification of NM constitutes a CM miss and an NM hit, and therefore the value is NO at step 103 and YES at step 104, and the flow progresses to step 108. No corresponding directory entry 553 constitutes a CM miss and an NM miss, and the value is NO at step 103 and NO at step 104, and the flow advances to step 105.

At step 105, the command processing program 451 calls up the control program 454. Then, the cache control program 454 allocates a CM segment and executes processing. This processing will be explained later while referring to FIG. 9.

At step 106, the command processing program 451 calls up the RAID control program 453. Then the RAID control program 453 conducts staging from the location (location of the parity group) specified from the PG ID and slot number calculated at step 101 to the CM segment allocated at step 105.

At step 107, the RAID control program 453 calls up the cache control program 454. The cache control program 454 executes processing to set the attribute to clean. Concretely, for example, the cache control program 454 sets the directory entry 553 corresponding to the CM segment at the staging address to slot attribute "clean".

At step 108, the command processing program 451 specifies the CM segment 462 or NM segment 463 from the segment address recorded at the corresponding directory entry 553. Then, the command processing program 451 transfers data from the specified CM segment 462 or NM segment 463 to the host 200 that was the source of the transmitted read command. The data may be directly transferred from the NM segment 463 to the host 200 without the mediation of the CM 311A, or the data may be transferred to the host 200 through the CM 311A (for example, once a CM segment has been allocated and the data is copied thereto from the NM segment). Mediation through the CM 311A may be considered, for example, when the NM 313A comprises a storage device unit 351 without being connected to an interconnection network 316A.

At step 109, the command processing program 451 transmits a response (for example, a read complete).

At step 110, the command processing program 451 executes sequential training. Specifically, the command processing program 451 determines whether or not the transmitted data is read by sequential access.

At step 111, the command processing program 451 call up the cache control program 454. The cache control program 454 executes queue transition. Concretely, for example, corresponding to whether the segment classification of the aforementioned corresponding directory entry 553 is CM or NM, and corresponding to whether the training results at step 110 are sequential or not, the cache control program 454 removes the aforementioned corresponding directory entry 553 from the current LRU control structure, and links (for example, directly links) the entry to the CM random clean queue MRU pointer, the CM sequential clean queue MRU pointer, or the NM clean queue MRU pointer.

In the processing above, if there is a CM miss together with an NM miss, a CM segment is allocated as a staging address. For this reason, it is possible to prevent an increase in the number of times of updating an NM segment, and consequently it is possible to suppress NM degradation.

Figure 7:
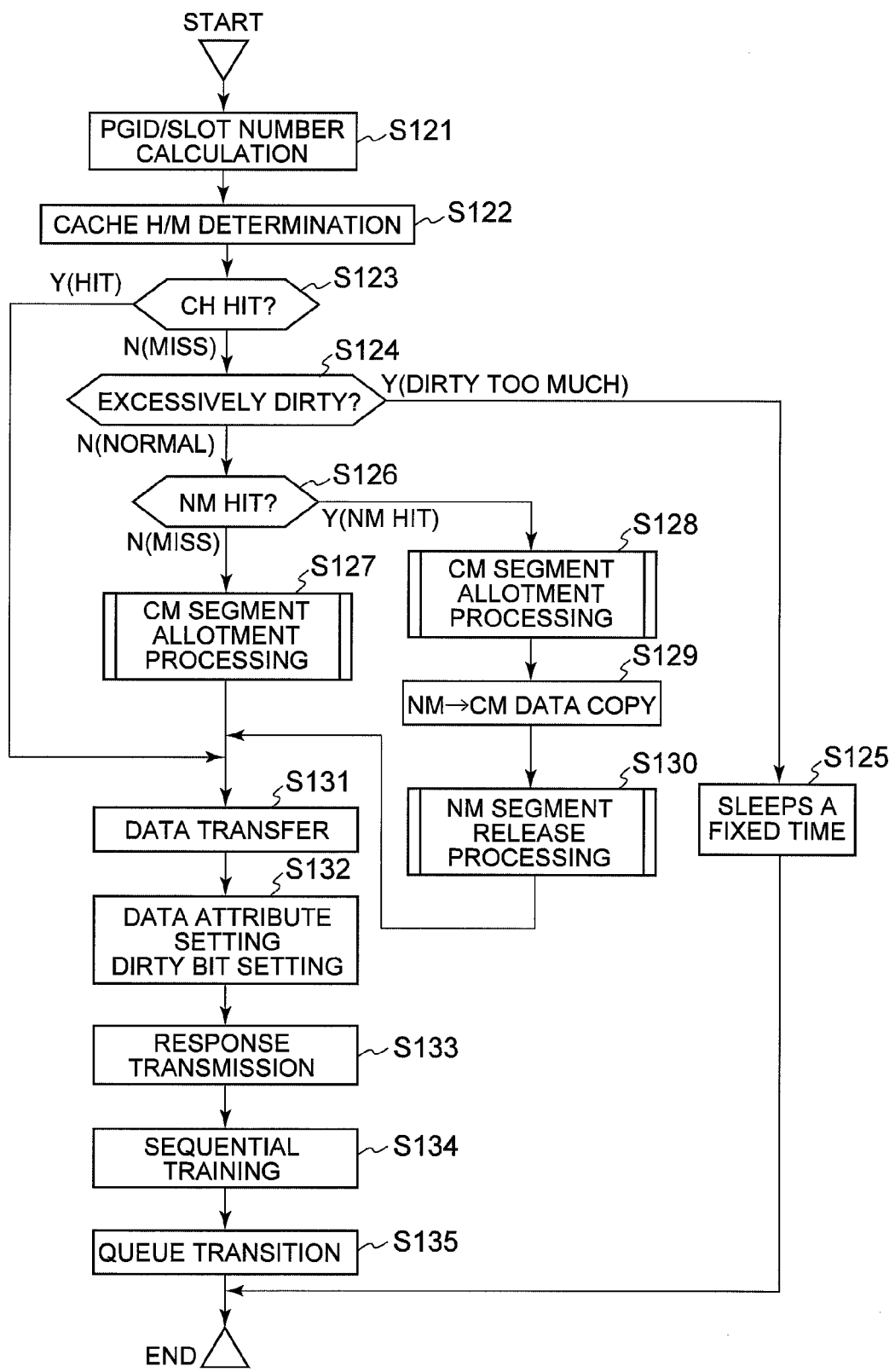
FIG. 7 indicates one example of the processing flow executed when a write command has been received by the host I/F.

FIG. 7 indicates one example of processing flow executed when a write command is received by the host I/F. In addition, in the following explanation, the parts that duplicate the explanation given while referring to FIG. 6 will be omitted or abbreviated.

At step 121, the command processing program 451 calculates the PG ID/slot number from the access address information designated by the write command.

At step 122, the command processing program 451 determines whether there is a cache hit or miss in the same way as in step 102. If there is a CM hit in this step 122, the value at step 123 is Y, and the flow advances to step 131. With a CM miss, if excessive dirty data at CM 311A (for example, the number of directory entries with slot attribute "dirty" has reached a stipulated value) is detected from the number of directory entries that configure the queue attributed to CM random, the value is NO at step 123 and YES at step 124, and therefore, the flow advances to step 125, and waits a fixed time. With CM miss, if the dirty data is not excessive at CM 311A and there is an NM hit, the value is NO at step 123, NO at step 124, and YES at step 126, and therefore, the flow advances to step 128. With CM miss, if the dirty data is not excessive at CM 311A and there is an NM miss, the value is NO at step 123, NO at step 124, and NO at step 126, and therefore, the flow advances to step 127.

At step 127 and step 128, CM segments are allocated and processing is executed in the same way as in step 105. At this time, in order to prevent loss of dirty data based on a single failure, segments are allotted in both CMs.

At step 129, the command processing program 451 calls up the cache control program 454. The cache control program 454 copies the data from the NM segment that had the NM hit to the CM segment allocated at step 128.

At step 130, the cache control program 454 executes NM segment release processing in order to make the NM segment of the copy source "free". This processing will be explained later by referring to FIG. 22.

At step 131, the command processing program 451 transfers the data following the write command from the host 200 to the CM segment allocated at step 127 or to the CM segment with the copy address of step 129. Specifically, the data is written to the CM segment.

At step 132, the command processing program 451 calls up the cache control program 454. The cache control program 454 sets a dirty attribute and sets a dirty bit. Concretely, for example, cache control program 454 sets a slot attribute "dirty" to the directory entry 553 corresponding to the CM segment of the data transfer address, and validates a bit corresponding to that CM segment in the dirty bitmap of that directory entry 553. Further, at this stage, the attribute is set to dirty because the data written to the CM segment has not yet been destaged by the storage device 353.

At step 133, the command processing program 451 transmits a response (for example, write complete).

At step 134, the command processing program 451 executes sequential training.

At step 135, the command processing program 451 calls up the cache control program 454. The cache control program 454 executes queue transition. Concretely, for example, corresponding to whether the training results at step 134 are sequential or not, the cache control program 454 removes the aforementioned corresponding directory entry 553 from the current LRU control structure, and links (for example, directly links) the entry to the CM random dirty queue MRU pointer, or the CM sequential dirty queue MRU pointer.

In the processing above, if there is a CM miss together with an NM miss, a CM segment is allocated as a data transfer address. For this reason, it is possible to prevent an increase in the number of times of updating an NM segment, and consequently it is possible to suppress NM degradation.

Moreover, in the above processing, if there is an NM hit, the data on the NM segment with the NM hit is not updated (overwritten), and the data is copied from that NM segment to a CM segment, and the data on the CM segment with the copy address is updated. It is thereby possible to control the increase in the number of times the NM segment is updated. Moreover, if the type of NM 313A has a slower write speed than read speed (for example, if the NM 313A is flash memory), then it is possible to control a lengthening of the time required for write command processing. In addition, the consumption of NM 313A free space can also be controlled.

Further, the RAID control program 453 periodically or at unscheduled times destages the dirty data on the CM 311A. In this case, the RAID control program 453 can prioritize destaging from the LRU dirty data.

Figure 24:
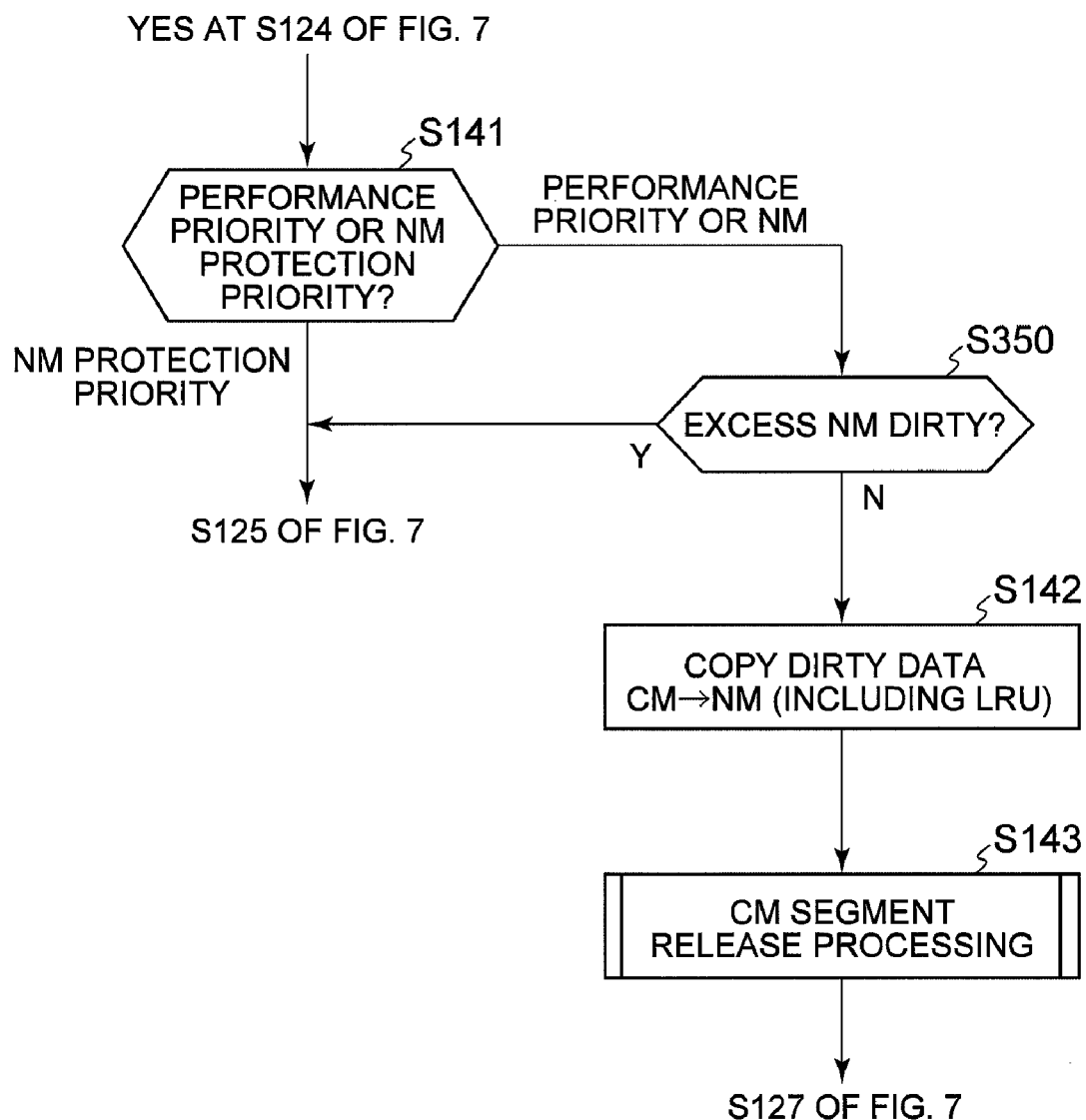
FIG. 24 indicates a variant example of the processing executed when the first embodiment is excessively dirty.

Moreover, in the aforementioned processing of FIG. 7, for example, in the same way as indicated in FIG. 24, if the value is YES at step 124, the cache control program 454 may determine when there is performance priority or NM protection priority (step 141). Performance priority means that heightening the processing speed of the write command has priority over NM protection. Meanwhile, NM protection priority means that NM protection has priority over heightening the processing speed of the write command. Whether there is performance priority or NM protection priority may be designated from the host 200 that transmits the write command, or may be preset from the SVP 363 in relation to the various MP 303A and 303B. If there is NM protection priority, the cache control program 454 can advance to step 125 of FIG. 7. Meanwhile, if there is performance priority, it is first confirmed whether or not the amount of NM dirty segments is so great that a dirty backup from the CM to the NM is impossible (step 350). If the amount of NM dirty segments is not excessive, NM segment guarantee processing is executed, and NM segments are allocated. Then, the cache control program 454 copies the dirty data on the CM 311A to the NM 313A (step 142). At this time, copying from LRU dirty data can have priority. Then, the cache control program 454 executes CM segment delete processing to make the release processing CM segment of the copy source "free" (step 143), and the flow can advance to step 127 of FIG. 7. As described above, if the dirty data is excessive at CM 311A, an exception is made for copying dirty data from the CM 311A to the NM 313A, space on the CM is cleared, and new data can be stored in the cleared space. Moreover, it is possible to execute this kind of processing or to wait a fixed time corresponding to whether performance priority or NM protection priority is selected. Further, if dirty data is copied from the CM 311A to the NM 313A, cache control program 454 creates a queue in the cache control information 461 for LRU control of the NM dirty segments.

Moreover, in FIG. 6, the determination of excessive dirty segments may be executed between steps 103 and 104 in the same way as in step 124 of FIG. 7. This is because there may be no clean and free CM segments on the CM 311A, and the dirty CM segments are full. As in FIG. 7, the flow may simply wait a fixed period, or the processing explained while referring to FIG. 24 may be applied.

Figure 8:
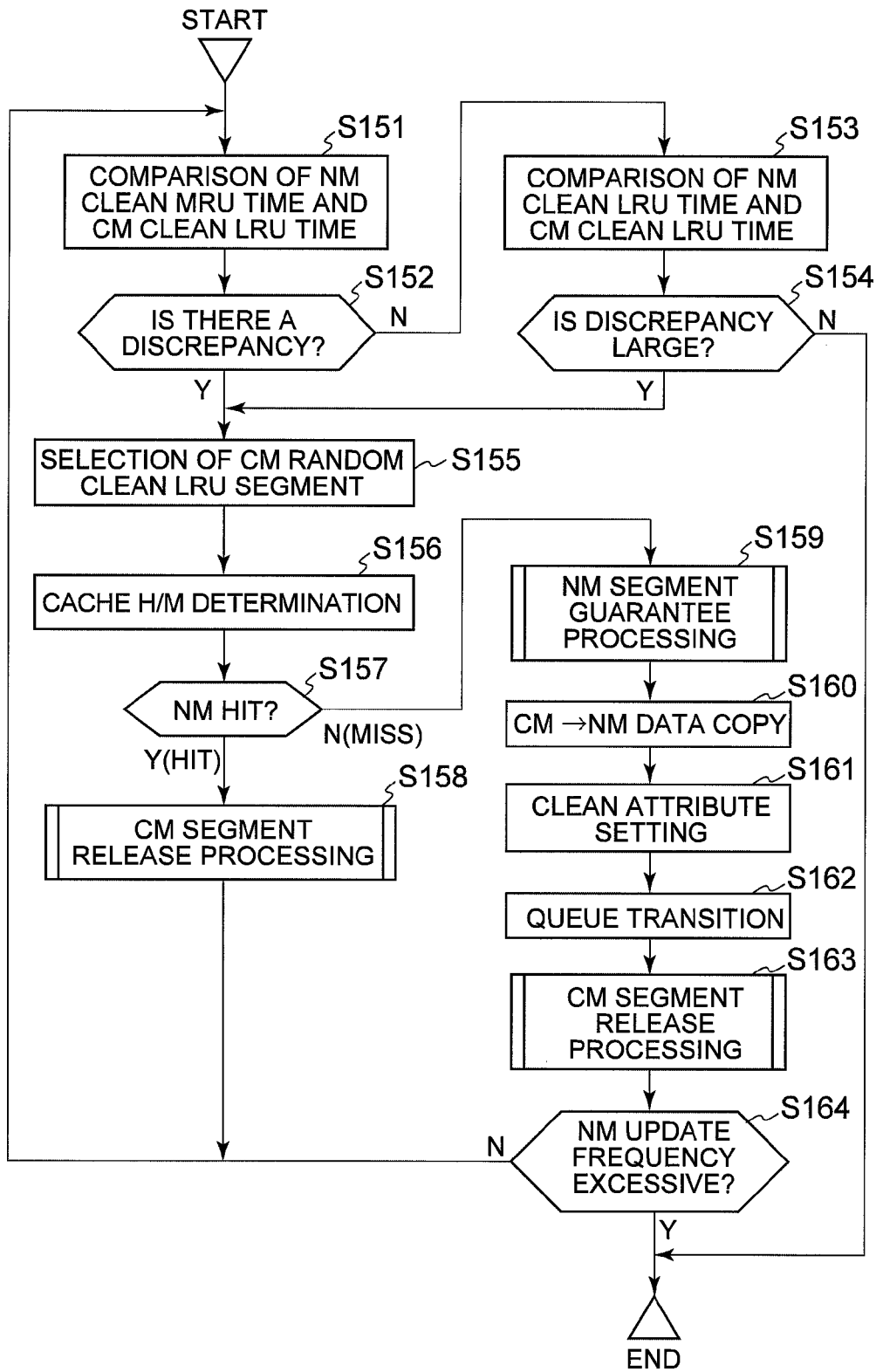
FIG. 8 indicates one example of the NM replacement processing flow.

FIG. 8 indicates one example of the NM replacement processing flow.

The NM replace program 459 may, for example, periodically begin the NM replace processing indicated in this FIG. 8. This NM replace processing, for example, is processing executed for the purpose of eliminating as much as possible any difference between the NM clean MRU time (the time that NM clean data is recorded in a MRU directory entry 553) and the CM clean LRU time (time that CM clean data is recorded in a LRU directory entry 553), and for keeping the difference between the NM clean LRU time (time that NM clean data is recorded in a LRU directory entry 553) and the CM clean LRU time from being excessive. Further, for both the CM and NM, cleaning, or copying from the CM to the NM, is in principle for the purpose of clean data.

At step 151, the NM replace program 459 compares the NM clean MRU time with the CM clean LRU time, and determines whether there is a difference in those times (whether or not there is a discrepancy). If there is a discrepancy (specifically, the NM clean MRU is older than the CM clean LRU), the value is YES at step 152, and the flow advances to step 155. On the other hand, if there is no discrepancy, the value is N at step 152, and the flow advances to step 153.

At step 153, the NM replace program 459 compares the NM clean LRU time with the CM clean LRU time, and determines whether or not there is a large difference between these times (large discrepancy). A large discrepancy is, for example, when that difference exceeds a specified value, or when specified conditions are met based on a specified preset volume ratio (for example, the volume of an NM clean segment group when the volume of the CM clean segment group is taken as 1). These conditions can be, for example, "the NM clean LRU time is older than the CM clean LRU time×(volume ratio+1)". If the discrepancy is large, the value is YES at step 154, and therefore the flow advances to step 155, and if the discrepancy is not large, the value is N at step 154, and therefore the current NM replace processing is ended. Further, the previously described volume ratio, for example, is 2. Specifically, for example, if the volume of the CM clean segment group is 1, the volume of the NM clean segment group is 2.

At step 155, the NM replace program 459 selects the CM random clean LRU segment (a CM segment that stores data that is at once random and clean, and that is the LRU). This can be executed by referring to the directory entry 553 linked to the CM random clean queue LRU pointer 557.

At step 156, the NM replace program 459 determines whether the NM 313A cache is hit or miss. Concretely, the program determines whether or not there is an NM segment having data within the selected the CM random clean LRU segment. More concretely, for example, the program determines whether or not there is an NM clean directory entry 553 having a PG ID/slot number the same as the PG ID/slot number in the directory entry 553 corresponding to the CM random clean LRU segment. If there is such a directory entry 553 (YES at step 157), the flow advances to step 158, and if there is no such directory entry 553(N at step 157), the flow advances to step 159.

At step 158, the NM replace program 459 calls up the cache control program 454. The cache control program 454 executes CM segment release processing in order to "free" the CM random clean LRU segment selected at step 155.

At step 159, the NM replace program 459 calls up the cache control program 454. The cache control program 454 executes NM segment guarantee processing for guaranteeing the NM segment that shall copy the address of the data on the CM random clean LRU segment selected at step 155.

At step 160, the NM replace program 459, for example, operates the DMA controller 304A, and copies the data from the CM random clean LRU segment to the guaranteed NM segment by DMA.

At step 161, the NM replace program 459 calls up the cache control program 454. The cache control program 454 executes processing to set the attribute to clean. Concretely, for example, the cache control program 454 sets the slot attribute to "clean" at the directory entry 553 corresponding to the NM segment at the copy address.

At step 162 the cache control program 454 executes queue transition. Concretely, for example, the directory entry 553 that had the slot attribute set to "clean" at step 161 is removed from the current LRU control structure, and the entry is linked (for example, directly linked) to the NM clean queue MRU pointer.

At step 163, the cache control program 454 executes CM segment release processing in order to "free" the CM random clean LRU segment.

At step 164, the NM replace program 459 determines whether the NM 313A number of update times is excessive. Concretely, for example, the number of update times per unit of time, that is, the update frequency, can be calculated by the MP 303A executing a specified computer program (hereinafter, NM update count program), counting the number of update times each time the data is updated on the NM 313A, and resetting the count value every unit of time (for example, one minute). The counted value of number of update times is not limited to NM replace processing, and the NM 313A may also be updated by other types of processing. The number of update times can be calculated in various units such as NM segment units, slot units, or single NM units If the update frequency exceeds the specified threshold value (YES at step 164) based on copying executed at step 160, the NM replace program 459 ends the current NM replace processing, and if not exceeded (N at step 164), then step 151 is executed again.

According to the above NM replace processing the following are executed: (1) CM clean LRU is backed up to the NM 313A; (2) however, a sequential attribute of clean is not backed up; and (3) the backup frequency is controlled. For this reason, the NM 313A update frequency can be controlled.

Figure 9:
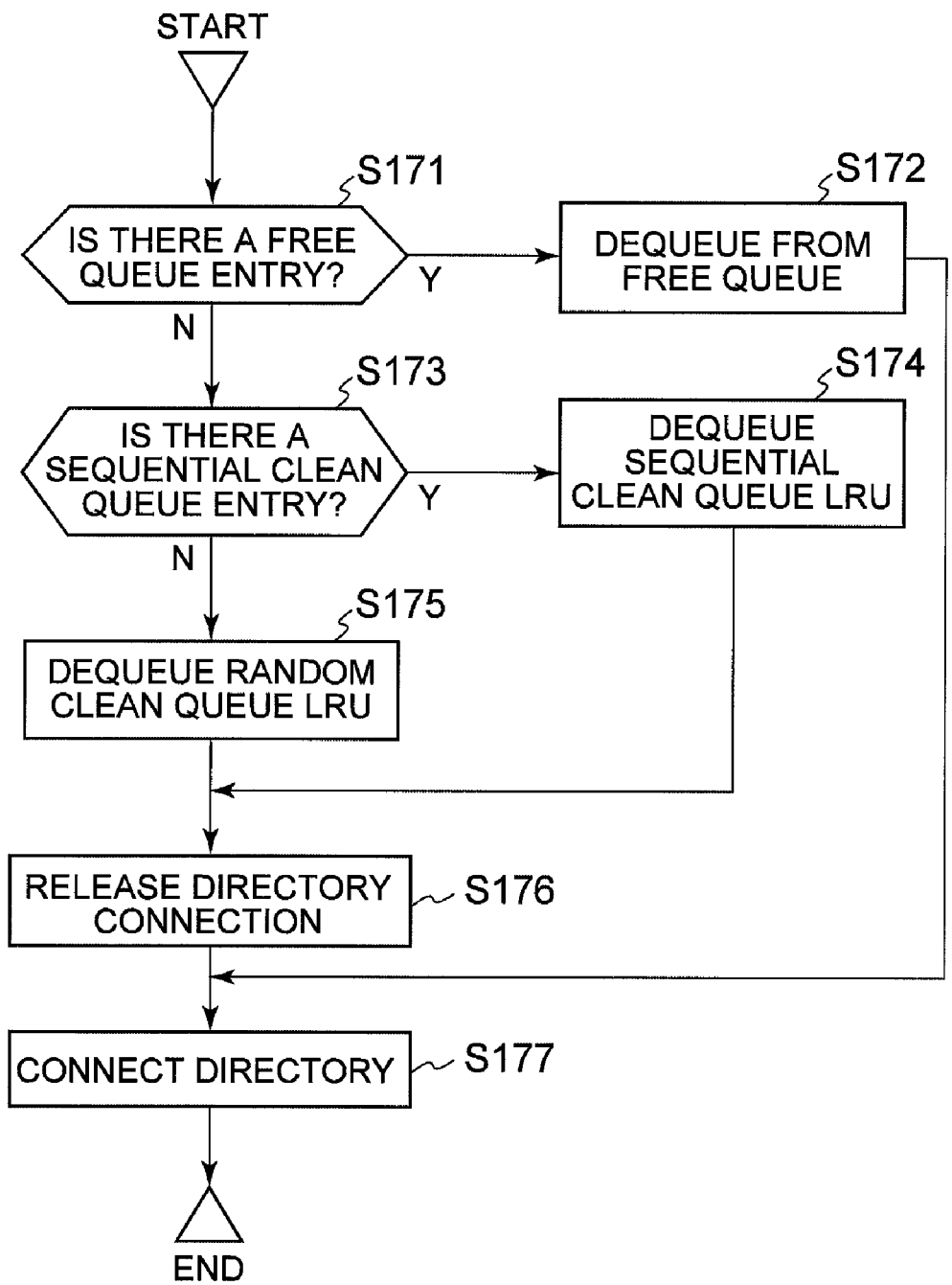
FIG. 9 indicates one example of segment allocation processing flow.

FIG. 9 indicates one example of the segment allocation processing flow. An explanation of CM segment allocation processing will be given below.

At step 171, the cache control program 454 determines whether there is a directory entry in the CM free queue. The flow advances to step 172 if there is, and to step 173 if not.

At step 172, the cache control program 454 dequeues (that is, removes from the free queue) the directory entry 553 (for example, the directory entry 553 linked to the CM free queue pointer) from the CM free queue. Then the flow advances to step 177.

At step 173, the cache control program 454 determines whether there is a directory entry in the CM sequential clean queue. The flow advances to step 174 if there is, and to step 175 if not.

At step 174, the cache control program 454 dequeues the directory entry 533 linked to the LRU pointer from the CM sequential clean queue. Then the flow advances to step 176.

At step 175, the cache control program 454 dequeues the directory entry 533 linked to the LRU pointer from the CM random clean queue. Then the flow advances to step 176.

At step 176, the cache control program 454 executes directory connection release. Concretely, cache control program 454 releases the connection between the hash table 551 and the dequeued directory entry 553.

At step 177, the cache control program 454 executes directory connection. Concretely, cache control program 454 records in the directory entry 553 the PG ID and slot number that is the current storage address, and links the hash table 551 and this directory entry 553 by connecting the directory entry 553 to the directory entry pointer of the hash table 551 corresponding to the hash value of the PG ID and slot number.

The above segment allocation processing is essentially the same for NM segments. A point of difference is that because there is no distinction made between sequential and random for NM segments, if N at step 171, the directory entry is dequeued from the NM clean queue, and the flow advances to step 176.

Figure 22:
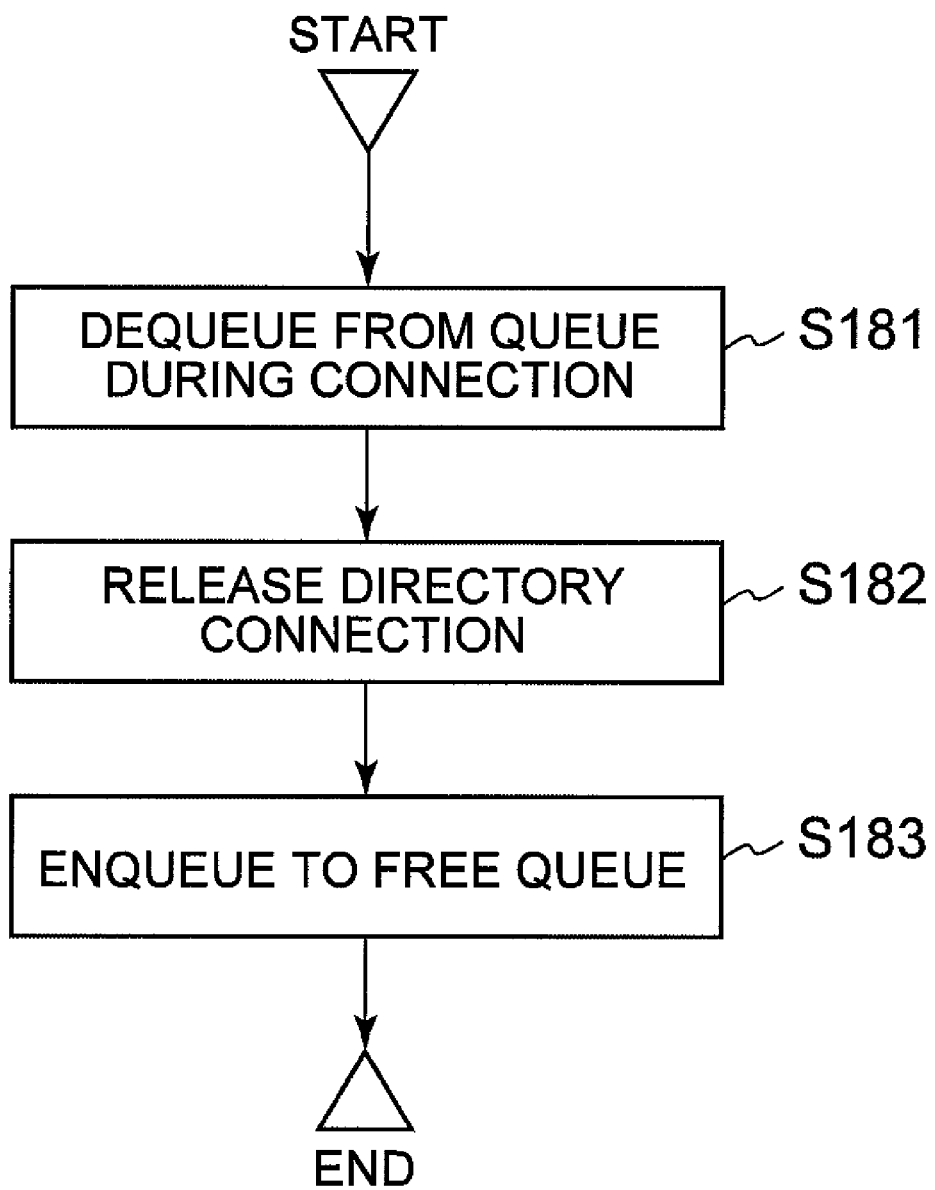
FIG. 22 indicates one example of the segment release processing flow.

FIG. 22 indicates one example of the segment release processing flow.

This segment release processing is executed in release processing for both CM and NM segments.

At step 181, the cache control program 454 dequeues the directory entry 553 corresponding to the segment targeted for release from the queue during connection (the queue in which that directory entry 553 is a configurational element).

At step 182, the cache control program 454 executes directory connection release for the directory entry 553 that has been dequeued.

At step 183, the cache control program 454 enqueues the dequeued directory entry 553 in a free queue (for example, links (for example, directly links) that directory entry 553 to the queue pointer of a free queue).

Figure 10:
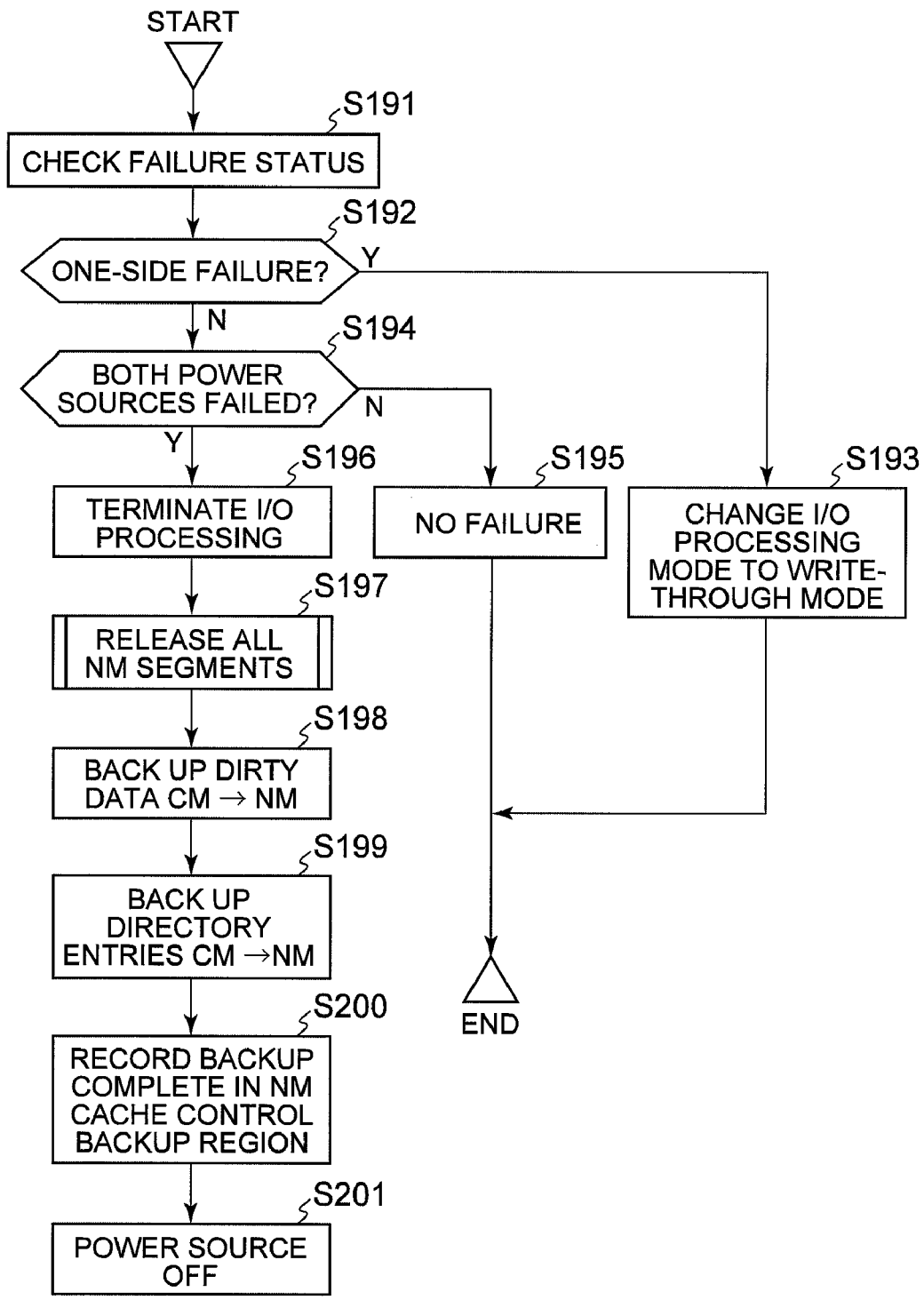
FIG. 10 indicates one example of the processing flow executed when a failure occurs.

FIG. 10 indicates one example of the processing flow executed when a failure occurs.

This processing is, for example, executed periodically.

At step 191, the failure processing program 457 checks the failure status by checking the various members. If the results of that check determine a single-side failure, concretely, for example, if determined that the CM 311 of either cluster has broken down, or if determined that no power has been supplied from the power source circuit of the power source unit 314 to the CM 311 of either cluster (refer to FIG. 12), then the value is YES at step 192, and the flow advances to step 193. Moreover, if the results of that check determine both power sources have failed, concretely, for example, if determined that the power supply of the two systems have gone to power supplied from the batteries of the power source units 314A and 314B because of a natural disaster or the like, the value is N at step 192 and YES at step 194, and the flow advances to step 196. If there has been neither a single-side failure nor a failure of both power sources, then it is determined that there has been no failure, and that data backup on the CM 311A and 311B is unnecessary (step 195).

At step 193, the failure processing program 457 changes the I/O processing mode to write-through mode. Concretely, for example, the command processing program 451 is configured such that the I/O processing mode of that program 451 can be selectively set to either write-through mode or normal mode. In write-through mode data is transferred to the storage device 353 without temporarily storing dirty data in the CM 311; and in normal mode the applicable dirty data is temporarily stored in the CM 311, and the temporarily stored data is then transferred from the CM 311 to the storage device 353. If an access command such as a write command is received when in normal mode, a response (for example, write complete) can be sent to the host 200 once the data has been temporarily stored in the CM 311. Meanwhile, in write-through mode, the response can be sent when the data is written to the storage device 353. For this reason, compared to the write-through mode, the normal mode can process the write command at higher speed in relation to the host 200, and therefore, in principle, the normal mode is used in the present embodiment. However, as stated above, if there is a single-side failure, the normal mode is changed to the write-through mode on an exceptional basis. After changing to write-through mode, in order not to generate a dirty segment in the CM 311, all of the dirty data in the CM 311 is destaged after a fixed time has elapsed. Further, for example, when the write-through mode is executed by power supplied from a battery, once all dirty data has been destaged, power supplied to the CM 311 is unnecessary, and operational time using power supplied from the battery can be lengthened by cutting the switch for supplying power to the CM 311.

The operations from step 196 to step 201 are executed by the various clusters when both power sources have failed, but those operations, for example, backing up dirty data from the CM 311 to the NM 313 and backing up cache control information 461 (refer to FIG. 13) are executed using power from the batteries of the power source units 314A and 314B. The operations of one cluster will be explained below as an example.

At step 196, the command processing program 451 executes an I/O processing stop. Concretely, for example, the command processing program 451 makes it impossible to receive access commands in relation to the host 200 (for example, when access commands are received, an error message is returned).

At step 197, the command processing program 451 calls up the cache control program 454. The cache control program 454 "frees" all non-dirty NM segments attributed to regions other than the cache control backup region 393.

At step 198, cache control program 454 backs up (copies) the dirty data in CM segments attributed to the CM random dirty queue and CM sequential dirty queue to the NM segments released in step 197.

At step 199, the cache control program 454 backs up (copies) the cache control information 461 on the CM 311 to the cache control backup region 393. At this time, the directory entries 553 among the cache control information 461 are backed up, but the hash table 551 is not backed up. This is because, when restoring, the directory entry pointers from the various directory entries 553 can be acquired, and the hash table 551 can be constructed. Moreover, regarding the directory entries 553 to be backed up, it is possible to select and back up only the directory entries 553 with a slot attribute of "dirty". This is because the other directory entries 553 are not needed.

At step 200, the cache control program 454 records the back up completion (information that means the data has been reliably backed up) in the cache control backup region 393.

At step 201, the power supplied from the battery is turned off by the MP 303, (for example, the ON/OFF switch for the power from the battery is turned off).

Figure 12:
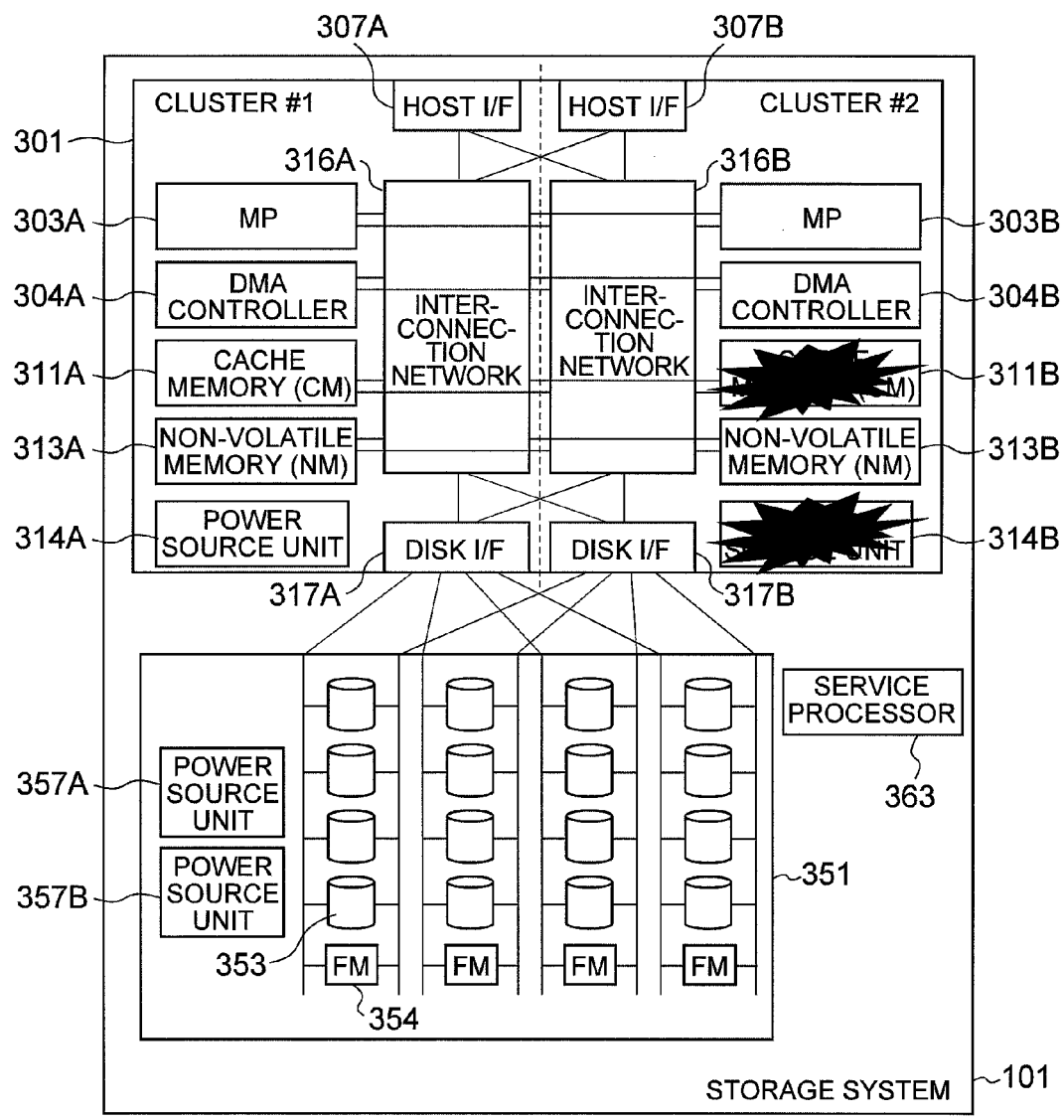
FIG. 12 indicates a single-side failure.
Figure 13:
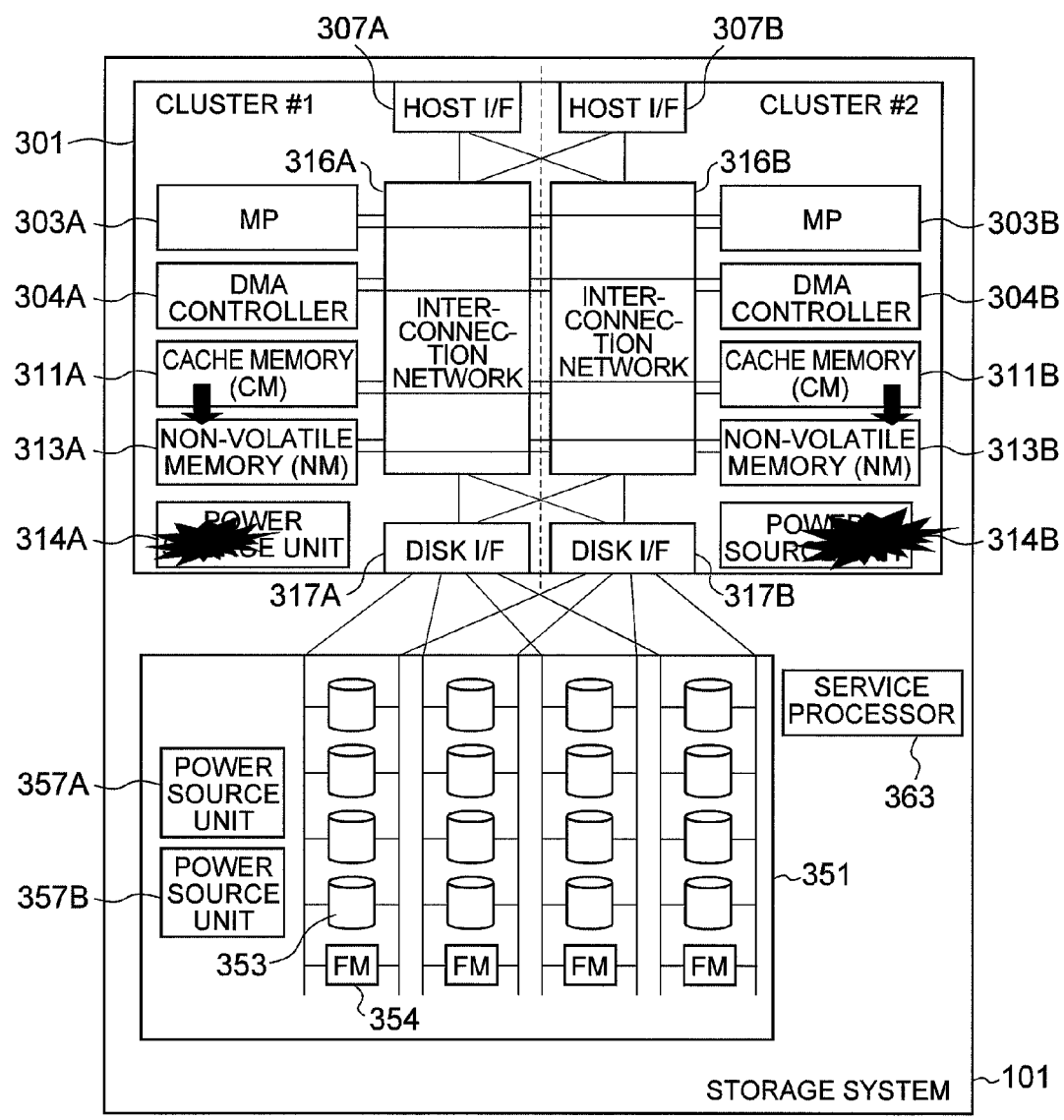
FIG. 13 indicates data backup when both power sources fail.

The above indicates one example of the processing flow executed when a failure has occurred. Further, indicated in FIG. 12 and FIG. 13 is an example of flash memory 354 mounted in the storage device unit 351 as one type of storage device 353. In this case, the flash memory 354 in the storage device unit 351 may be adopted in addition to or instead of the NM 313 as the backup address of the data and/or directory entries. Other types of NM may also be mounted instead of or in addition to the flash memory 354.

Figure 11:
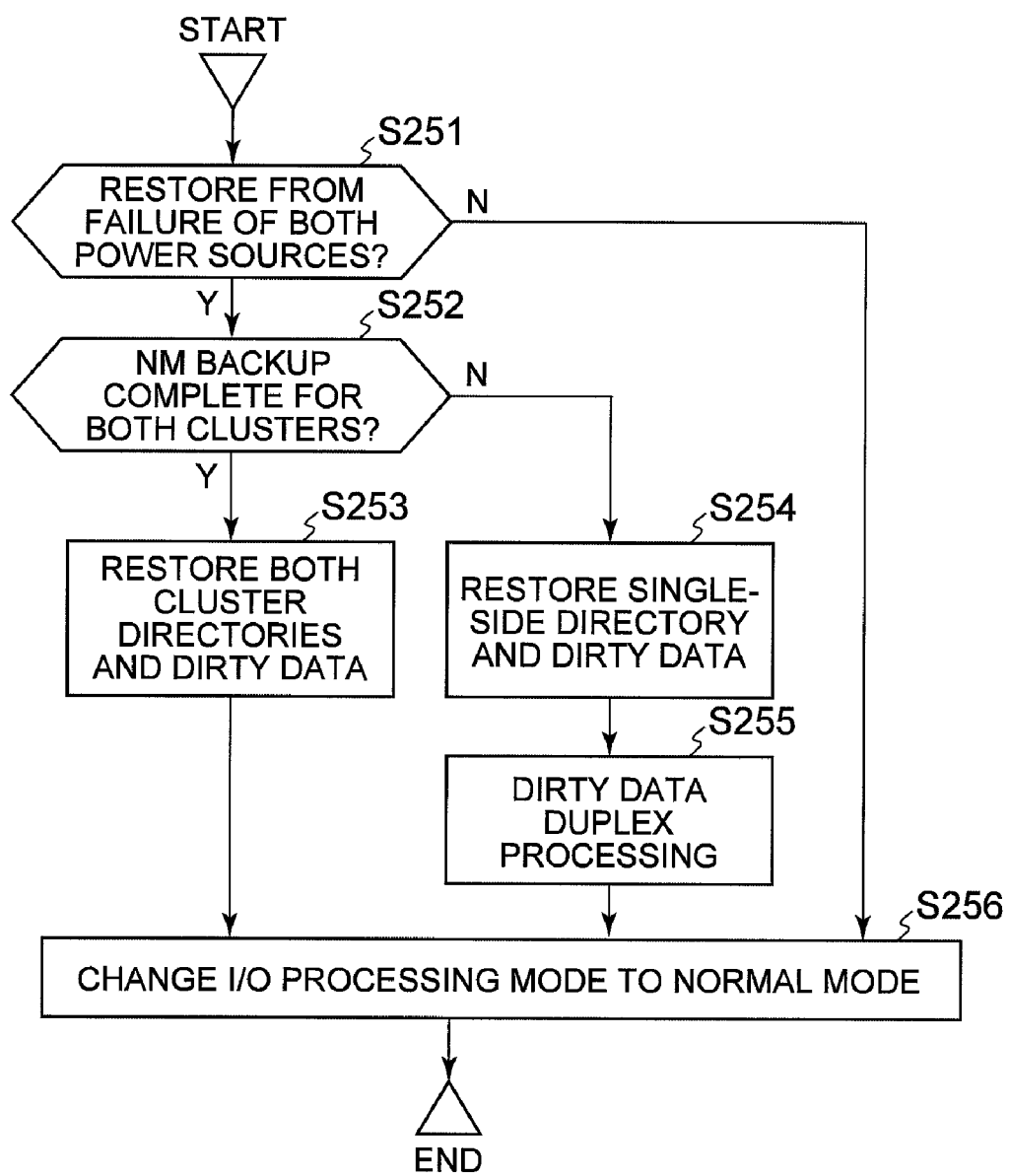
FIG. 11 indicates one example of processing flow executed during failure recovery.

FIG. 11 indicates one example of processing flow executed during failure recovery.

Recovery from single-side failure, for example, can be conducted by replacing a broken member (for example, a power source circuit of the power source unit 314). In this case, the fact that replacement of the broken member of the cluster on one side has been completed can be detected by the failure processing program 457 based on input from the SVP 363 to the MP 303, or based on an electric signal input to the MP 303 when replacement is finished. If restoration from the single-side failure has been detected (N at step 251), the failure processing program 457 returns the I/O processing mode from the write-through mode to the normal mode (step 256).

Meanwhile, restoration from a failure of both power sources, for example, can be executed when recovering from a black out, or when replacing broken members in both clusters. In this case as well, the failure processing program 457 can detect restoration from the failure of both power sources in the same way as is done with a single cluster. When restoration from a failure of both power sources has been detected (YES at step 251), the cache control program 454 is called up from the failure processing program 457 at each cluster. The cache control program 454 checks whether backup completion has been recorded in the cache control backup region 393 of the NM 313 (step 252). If the results indicate that backup was completed in both clusters (YES at step 252), the flow advances to step 253, and if backup was not completed at one cluster (N at step 252), the flow advances to step 254. Further, an example of backup not being completed at one cluster is when a failure occurs at the NM 313 of one cluster during backup.

Figure 14:
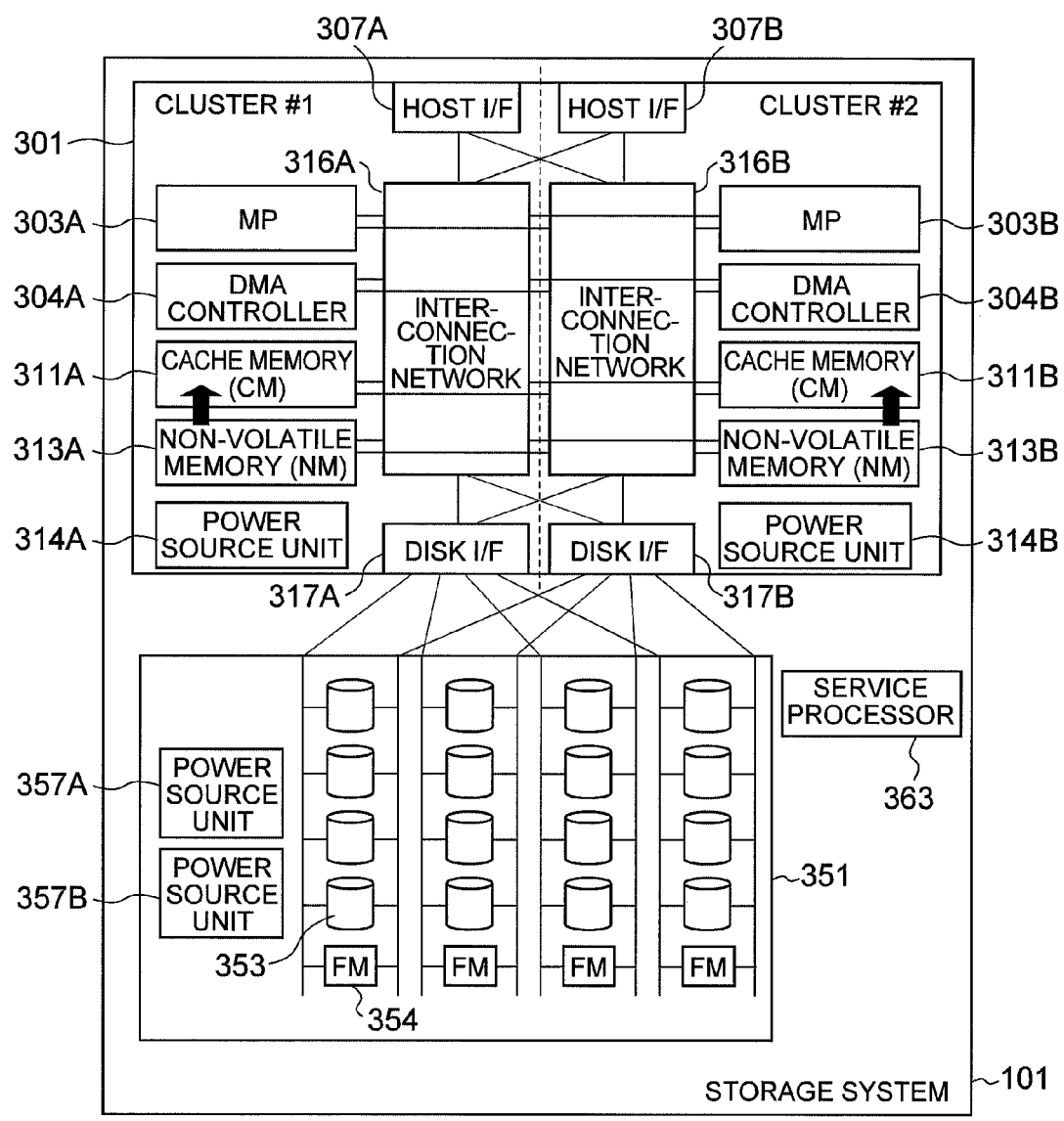
FIG. 14 indicates data restoration during failure recovery.

At step 253, for example, restore processing is conducted in both clusters as indicated in the example in FIG. 14. Concretely, cache control program 454 restores (copies) the directory entries 553 from the cache control backup region 393 of the NM 313 to the cache control region 377 of the CM 311. Moreover, the cache control program 454 restores (copies) the dirty data from the NM segment to the CM cache. When restoring the dirty data, for example, among the restored plurality of directory entries 553, NM segments are specified from the NM dirty directory entries 553, and the specified NM segments may be taken as the copy source. In the same way, for example, among the restored plurality of directory entries 553, CM segments are specified from the CM dirty directory entries 553, and the specified CM segments may be taken as the copy source. After step 253 has been executed, the previously described step 256 is executed.

At step 254, the restoration of directory entries and the restoration of dirty data explained at step 253 are executed for only one cluster. Then the flow advances to step 255.

At step 255, the cache control program 454 executes dirty data duplicate processing. Concretely, the cache control program 454 copies the dirty data restored to the CM 311 to the CM 311 of the other cluster. Afterwards, the previously described step 256 is executed.

The above is processing executed during failure recovery. Further, if restoration from the NM is not possible, the data and/or directory entries may be restored from the flash memory 354 of the storage device unit 351.

Embodiment 2

A second embodiment of the present invention will be explained below. At that time, the points of difference from the first embodiment will mainly be explained, and the explanation of common points will be omitted or abbreviated (the same holds for the third embodiment to be described later).

Figure 15A:
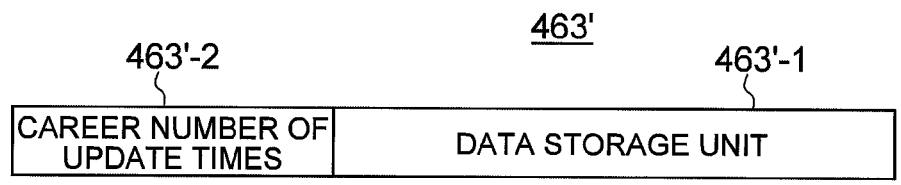
FIG. 15A indicates an example of a configuration of the NM segment of a second embodiment of the present invention.

FIG. 15A indicates an example of a configuration of an NM segment.

In addition to the data storage unit 463'-1, which is a region where data in a CM segment is written, the NM segment 463' also has a career number of update times storage unit 463'-2 that stores the career number of update times as one kind of control information. A program that can update data on the data storage unit 463'-1 of the NM segment 463' or a separately used computer program adds one to the career number of update times recorded in this NM segment 463' every time the data of this NM segment 463' is updated. The career number of update times means the number of times updated up to present, and differs from the update frequency explained in the first embodiment (specifically, the number of update times per unit time). A further update frequency storage unit that stores the update frequency in this NM segment 463' may also be used.

Figure 15B:
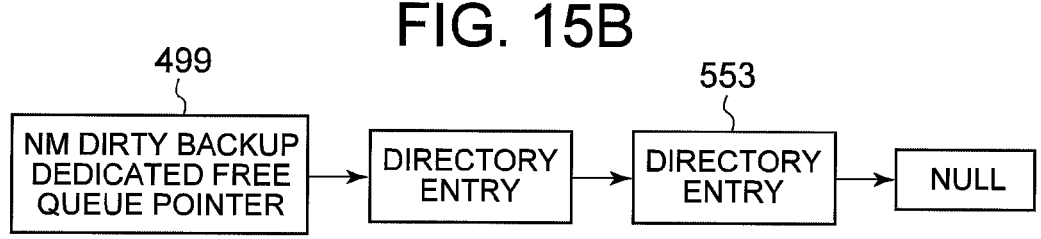
FIG. 15B indicates dirty backup dedicated free queue.

FIG. 15B indicates a dirty backup dedicated free queue.

In the second embodiment, a dirty backup dedicated free queue is also used. As will be described later, this is used because during normal time (time when no failure has occurred) an NM segment for which the career number of update times exceeds the specified threshold value is not made a copy address of clean data on a CM segment, and is only used as a backup address of dirty data during a failure. A directory entry 553 that is linked directly or through another directory entry to the NM dirty backup dedicated free queue pointer 499 is a directory entry corresponding to a dirty backup dedicated NM segment.

Figure 15C:
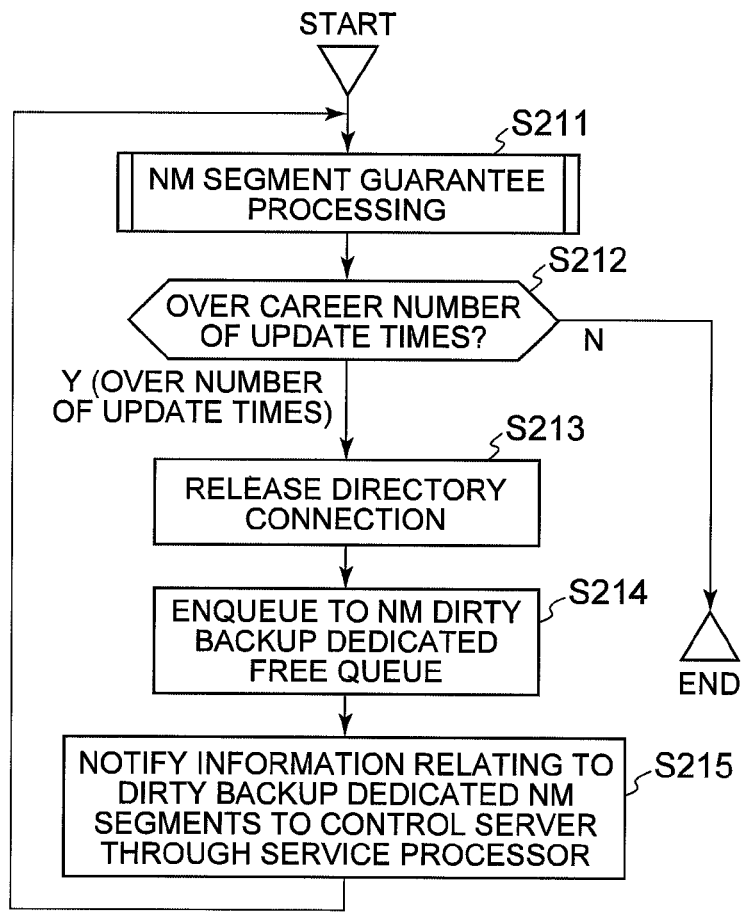
FIG. 15C indicates one example of the processing flow relating to NM segment guarantee processing.

FIG. 15C indicates one example of processing flow related to NM segment guarantee processing.

In NM segment guarantee processing (step 211), for example, in step 177 in FIG. 9, the NM segment corresponding the directory entry 553 newly linked to the hash table 511 is a guaranteed NM segment.

The cache control program 454 determines whether the career number of update times recorded at the guaranteed NM segment is over the specified threshold value (step 212). If determined to be over, the flow advances to step 213, and if determined to not be over, the flow ends (for example, if step 211 ends when at step 159 of FIG. 8, the flow advances to step 160 of FIG. 8).

At step 213, the cache control program 454 releases the directory connection. Concretely, the cache control program 454 releases the connection between the aforementioned directory entry 553 newly connected to the hash table 511 and that hash table 511.

At step 214, the cache control program 454 enqueues (for example, directly links) the directory entry 553 with the released connection to the NM free queue dedicated to dirty backup pointer 499.

At step 215, the cache control program 454 calls up the SVP communication program 455. The SVP communication program 455 notifies the SVP 363 about information related to the NM segment that has been made dirty backup dedicated, and the SVP 363 notifies the control server 400 about this information. Specifically, the control server 400 is notified about this information via the SVP 363. Here, the notified information, for example: may be information meaning that the number of NM segments that have become dirty backup dedicated has newly increased by one; may be specific types of information recorded in the aforementioned enqueued directory entry 553 (for example, NM segment addresses); may be the total number of NM segments (second total number) made into dirty backup dedicated segments among the total number of NM segments (first total number) present in NM 313; or may be the percentage of the second total number in relation to the first total number (specifically, the percentage of the NM occupied by NM segments made into dirty backup dedicated segments). The first total number and second total number may be controlled by the controller 301, or may be controlled by the SVP 363. The control person can know the NM 313 degradation status using this notified information itself or using information (for example, the second total number or the aforementioned percentage) calculated by the SVP 363 or control server 400 based on that information.

According to this second embodiment; the career number of update times is controlled for every NM segment, and NM segments with an excessive career number of update times are guaranteed as dirty backup dedicated segments during failure. Dirty data can thereby be reliably backed up from the CM 311 during failure. Moreover, clean data is not copied to NM segments with an excessive career number of update times, and therefore the situation of not being able to use NM because clean data has been copied to NM segments with an excessive career number of update times can be prevented.

Embodiment 3

Figure 16A:
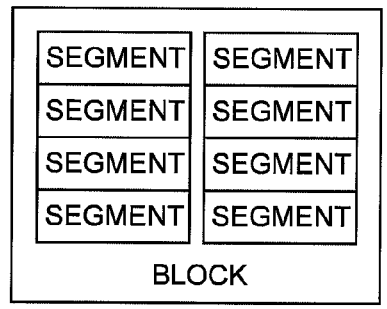
FIG. 16A indicates an example of a configuration of a NAND-type flash memory block.

In a third embodiment of the present invention, the NM 313 is a NAND-type flash memory (hereinafter, flash memory is abbreviated "FM"). The memory region of NAND-type flash memory is configured by a plurality of blocks. The blocks, as indicated in FIG. 16A, are configured by a plurality of segments (equivalent to the previously described NM segments, called "FM segments" hereinafter because they are segments of FM). In this example, one block is configured by eight FM segments, but the number of FM segments is not limited to eight and may be more or less than this.

Writing to NAND-type flash memory can be executed in segment units. With NAND-type memory, overwriting to FM segments is not possible, and in order to overwrite data onto FM segments, it is necessary to delete the data one time. Deletion is conducted in block units. For that reason, when desiring to overwrite data onto a given FM segment, it is necessary to delete the data of all the FM segments of the block in which that given FM segment is comprised as a configurational element. For that reason, data deletion is executed up to FM segments that do not require overwriting. Therefore, the number of update times (number of deletions) of the FM segments is prone to be greater than in those types of NM that can be deleted in FM segment units.

Thus, in this third embodiment, the LRU is not controlled in FM segment units, but rather in block units. Flash memory is abbreviated by "FM" hereinafter.

Figure 16B:
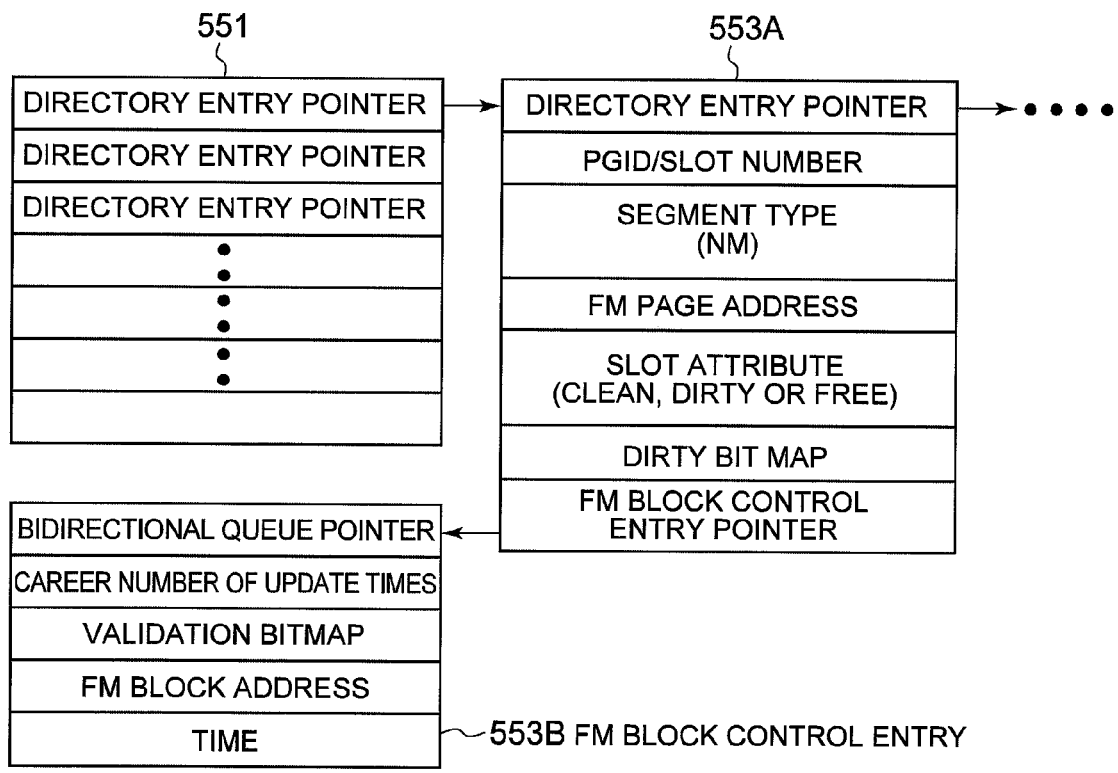
FIG. 16B indicates an example of a configuration of a directory entry 553A and an example of a configuration of an FM block control entry 553B of a third embodiment of the present invention.

FIG. 16B indicates the configuration of an example of the directory entry 553A in the third embodiment, as well as the configuration of an example of an FM block control entry 553B.

The FM block control entry pointer, which is the pointer of the FM block control entry 553B, is recorded on the directory entry 553A. Moreover, there is no bidirectional queue pointer on this entry 553A because the FM block control entry 553B is incorporated in the queue.

The bidirectional queue pointer, career number of update times, validation bitmap, FM block address and time are recorded in the FM block control entry 553B. The career number of update times means the career number of deletions of the FM block corresponding to this entry 553B (hereinafter, applicable FM block). The validation bitmap is configured by eight bits corresponding respectively to the eight FM segments configuring the applicable FM block, and the bit values express whether the FM segments are valid (clean or dirty) or invalid (free). The FM block address indicates the location of the applicable FM block. The time expresses the time when this entry 553B underwent queue transition. In read command and write command processing, when a directory entry 553A corresponding to an NM segment undergoes queue transition to the MRU during queue transition processing (step 111 in FIG. 6 and step 135 in FIG. 7), the corresponding FM block control entry 553B undergoes queue transition.

Figure 17:
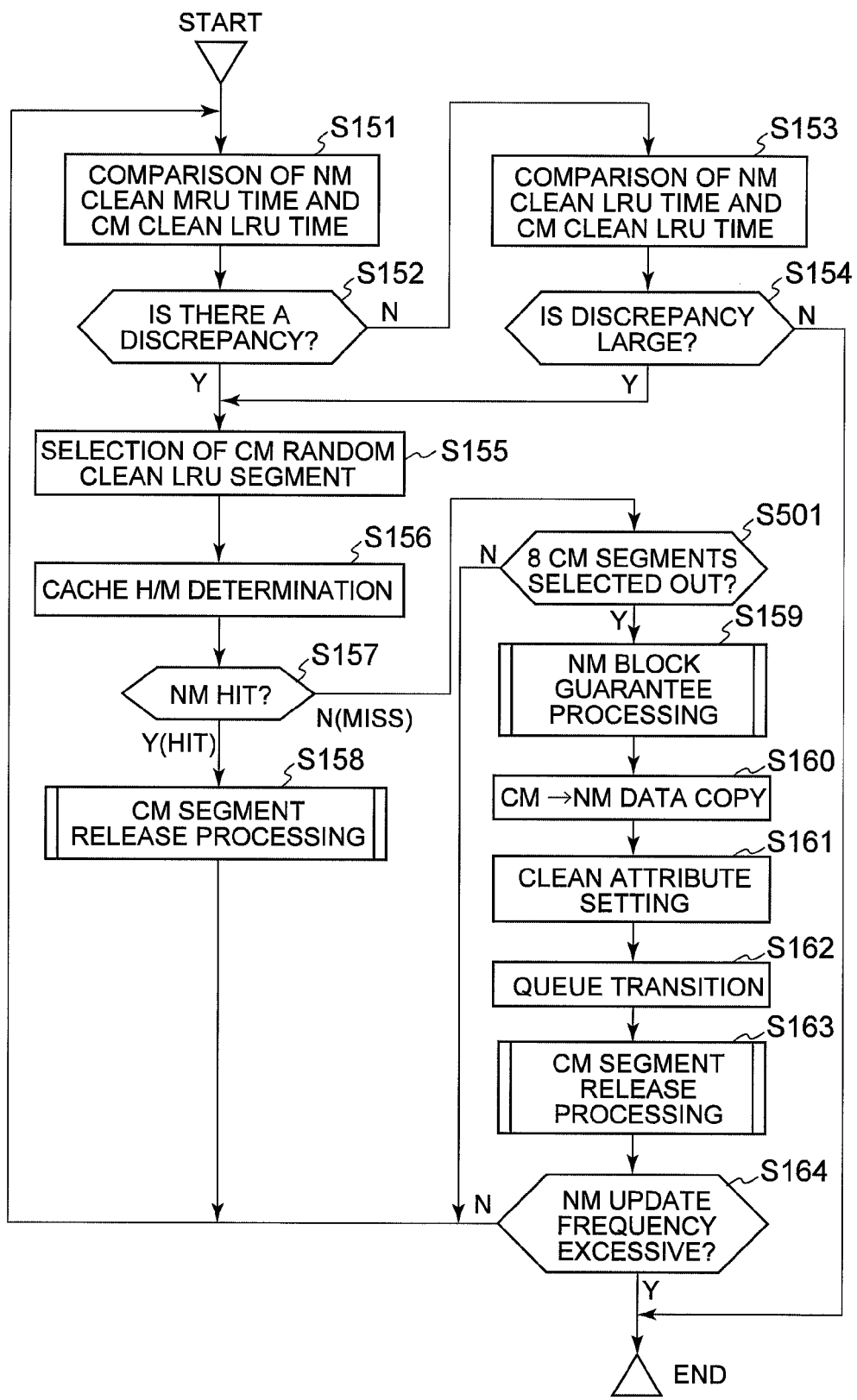
FIG. 17 indicates one example of the FM replacement processing flow.

FIG. 17 indicates one example of FM replacement processing flow.

FM replacement processing flow is similar to the NM replacement processing flow explained while referring to FIG. 8, but there are several points of difference.

A first difference is that, for example, in steps 159, 162 and so on, the FM block control entry 553B and not the directory entry 553A is used. This is because the FM block control entry 553B is incorporated into the queue for LRU control relating to the FM and into the free queue.

A second difference is that, for example, in step 155 eight CM random clean LRU segments are selected. Concretely, for example, when removing the directory entry directly linked to the CM random clean LRU queue pointer, the directory entry segment linked to the MRU side of that directory entry becomes directly linked to that LRU queue pointer. By conducting this processing eight times, the eight CM random clean LRU segments can be selected. Moreover, at step 159, one FM block control entry 553B is dequeued from the NM clean queue LRU, and release processing is executed for the eight corresponding FM segments. This kind of processing is conducted because, when copying from the CM to the NM, it may be necessary to execute delete operations on the NM one time, and if so, it would be more efficient to copy in block units. Specifically, copying data from eight CM random clean LRU segments to one FM block (namely, eight FM segments) is more efficient.

The third difference is that at step 501, which is between N at step 157 and step 159, the cache control program 454 determines whether eight CM segments have been selected out at step 155. If determined that the segments have not been selected out, the value is N at step 501, and if determined that the segments have been selected out, the value is YES at step 501, and the flow advances to step 159.

Figure 18:
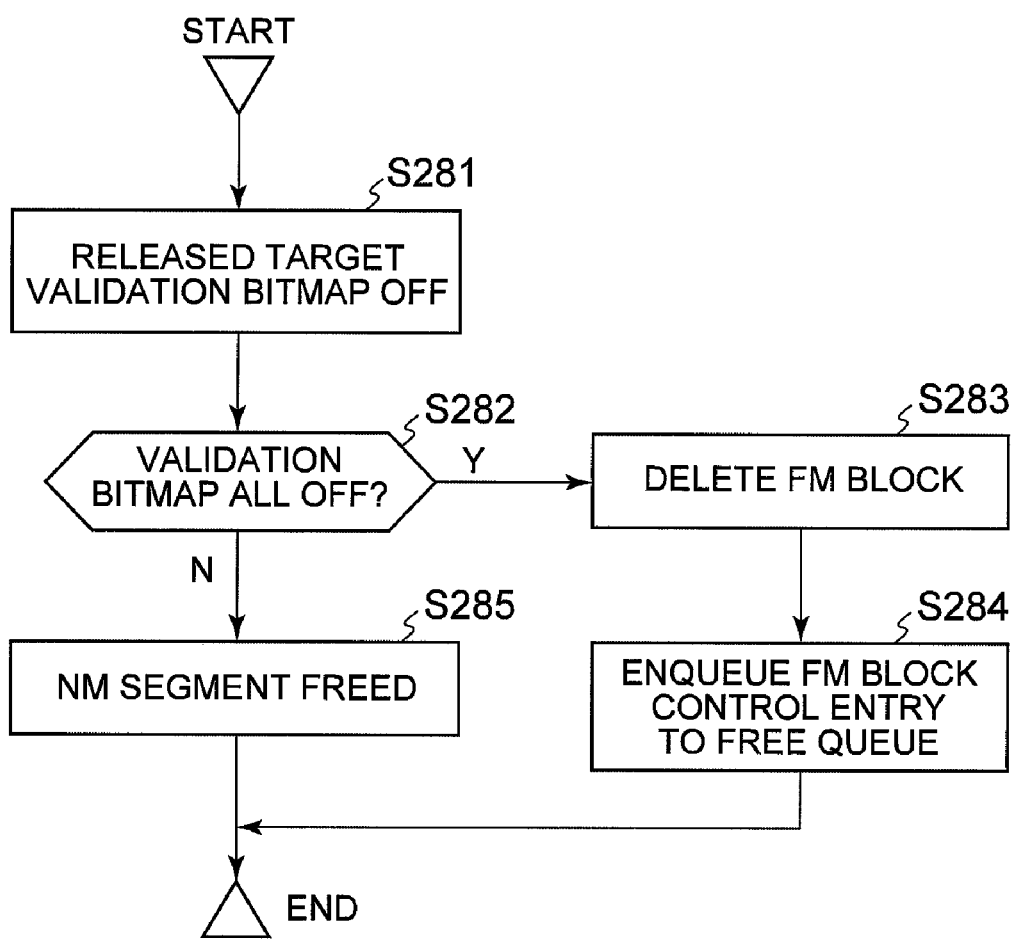
FIG. 18 indicates one example of the FM segment release processing flow.

FIG. 18 indicates one example of the FM segment release processing flow.

This processing begins, for example, when the write command from the host 200 has an NM hit, and when the specified FM segment within the FM block (for example, the FM segment of the copy source to the CM) has been made invalid. That specified FM segment is called the "release target FM segment" below.

At step 281, the cache control program 454 specifies the FM block control entry 553B of the FM block that contains the release target FM segment (hereinafter, release target FM block), and the bit corresponding to the release target FM segment is turned off in the validation bitmap of that FM block control entry 553.

At step 281, the cache control program 454 determines whether all bits that configure that valid bitmap are off. If determined that all bits are off (YES at step 282), the flow advances to step 283, and if determined that at least one bit is on (N at step 282), the flow advances the step 285.

At step 283, the cache control program 454 deletes the release target FM block. Then, at step 284, the cache control program 454 enqueues the FM block control entry corresponding to the release target FM block to the free queue.

At step 285, the cache control program 454 releases the release target FM segment. Concretely, for example, the cache control program 454 releases the connection between the directory entry 553 corresponding to that segment and the hash table 551.

Figure 23:
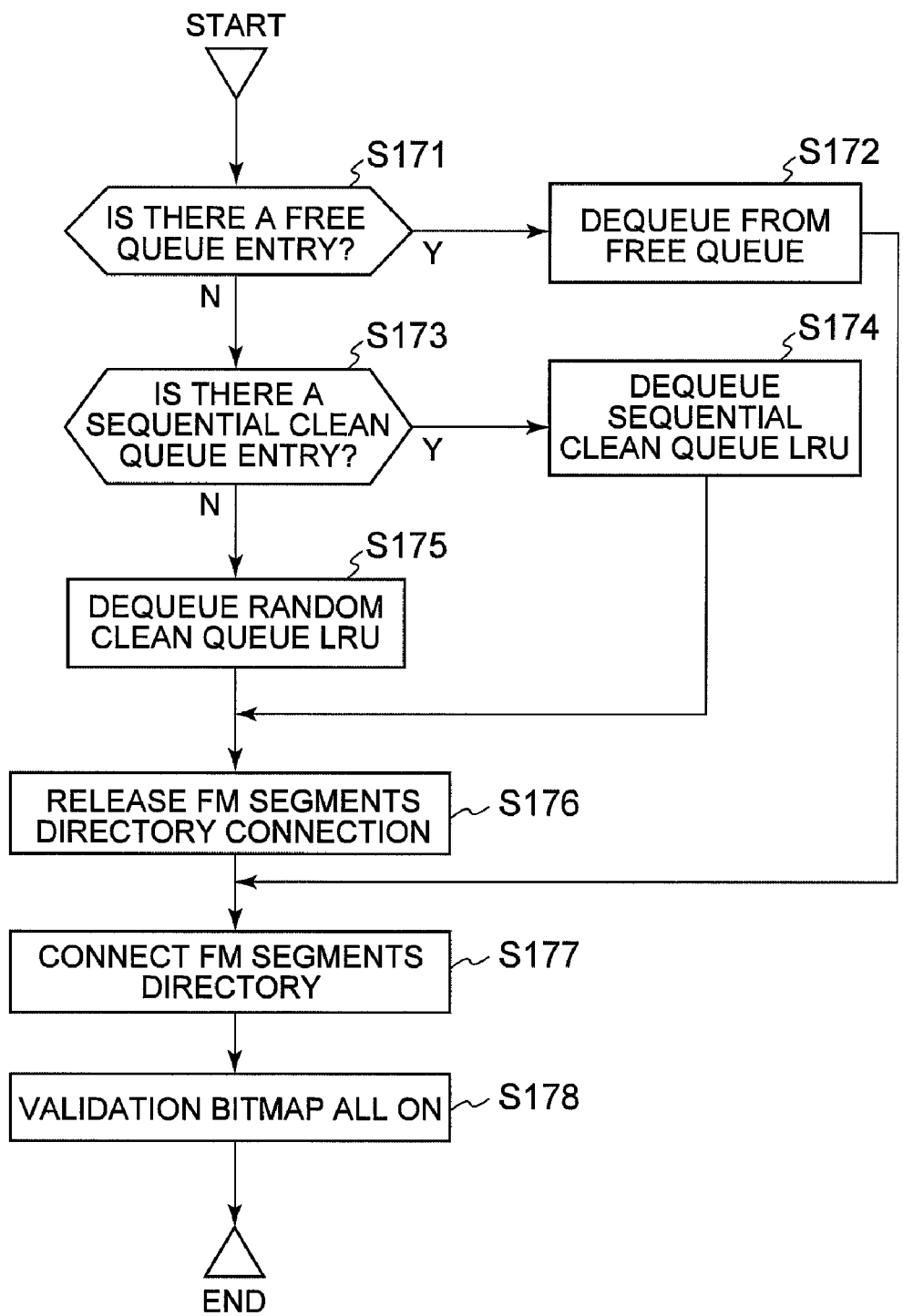
FIG. 23 indicates one example of the FM block allocation processing flow.

FIG. 23 indicates one example of the FM block allocation processing flow.

This allocation processing is similar to the allocation indicated in FIG. 9, but there are several differences.

A first difference, for example, is that FM block control entries 553B are dequeued at steps 172, 174 and 175.

A second difference is that at step 176, the connection of the hash directory and the eight directory entries 553A corresponding to the dequeued FM block control entry 553B is released. At step 177, these eight directory entries 553A are connected with the hash directory.

A third difference is that after step 177, a step 178 is executed. At step 178, the cache control program 454 turns on all bits to configure a valid bitmap for the FM block control entries 553B corresponding the connected eight directory entries 553A.

In this third embodiment, a NAND-type flash memory is adopted as the NM 313, and LRU control is conducted in block units. Then, no FM segments in the FM block can be accessed or released until selected in FM replace processing at step 159 (specifically, until the eight segments are released by selecting one FM block from the NM clean LRU based on FM block guarantee processing), or until the whole page in the FM block has become invalid. The number of times of deleting the FM block is thereby controlled, and consequently, degradation of the NAND-type flash memory can be controlled (in other words, the lifespan of the NAND-type flash memory is extended).

Several embodiments of the present invention have been explained above, but these embodiments are only examples for explaining the present invention, and this does not mean that the scope of the present invention is limited to just these embodiments. The present invention can be implemented in a variety of other forms as long as they do not deviate from the scope thereof. For example, in the third embodiment the career number of update times may be controlled in FM blocks by substituting or adding control based on FM block control entries 553B. Moreover, if the third embodiment has differing write units and deletion units, then NM other than NAND flash memory may also be used.

What is claimed is:

1. A storage system that receives access commands from an upper level device, comprising:
   a plurality of storage devices;
   a volatile cache memory;
   a non-volatile memory that is a type of memory that can continue to memorize data irrespective of whether or not power is supplied;
   an access control unit that, when the access command is a write command, temporarily memorizes the data following the write command in the volatile cache memory, and reads from the volatile cache memory and stores the memorized data in at least one of the plurality of storage devices, and that, when the access command is a read command, reads the data following the read command from at least one of the plurality of storage devices, temporarily memorizes the data in the volatile cache memory, and then reads from the volatile cache memory and transmits the memorized data to the upper level device;
   a battery that is a secondary power source; and
   a cache data copy unit that, when power is no longer supplied to the volatile cache memory from the primary power source, copies the data memorized in the volatile cache memory to the non-volatile memory based on power supplied from the battery,
   wherein when power is supplied from the primary power source to the volatile cache memory, the cache data copy unit specifies, from among a plurality of volatile sub-areas included in the volatile cache memory, LRU volatile sub-areas, and copies the data in the specified volatile sub-areas to the non-volatile memory.

2. The storage system according to claim 1, wherein the cache data copy unit copies the data memorized in the volatile cache memory to the non-volatile memory when power is supplied from the primary power source to the volatile cache memory, in which case a number of times of updating the non-volatile memory is counted, and it is determined whether the number of times of updating the non-volatile memory has exceeded a specified threshold value, wherein if determined to have exceeded the specified threshold value, the data memorized in the volatile cache memory is not copied to the non-volatile memory while power is supplied from the primary power source to the volatile cache memory, and wherein if power is not supplied from the primary power source to the volatile cache memory, power supplied from the battery is used to copy the data memorized in the volatile cache memory to the non-volatile memory.

3. The storage system according to claim 2, wherein the cache data copy unit counts the number of update times separately for a plurality of non-volatile sub-areas that the non-volatile memory comprises, and if determined that the number of update times for a given non-volatile sub-area in the non-volatile memory exceeds the specified threshold value, the given non-volatile sub-area is not made a copy address for clean data that has already stored in said storage devices and is only used for backup area during failure, which is a data copy address used when no power is supplied from the primary power source to the volatile cache memory.

4. The storage system according to claim 3, wherein the non-volatile memory is NAND-type flash memory, wherein the non-volatile sub-area is a block, wherein the block is a region comprising a plurality of segments, which are the unit regions for writing in relation to the NAND-type flash memory, and wherein the number of update times is the number of deletion times.

5. The storage system according to claim 3, wherein the cache data copy unit notifies a control server with information relating to the sub-areas used as the backup area address during failure.

6. The storage system according to claim 1, wherein when no power is supplied from the primary power source to the volatile cache memory, the cache data copy unit specifies, from among a plurality of volatile sub-areas included in the volatile cache memory, volatile sub-areas where dirty data is stored, and uses power supplied from the battery to copy the data in the specified volatile sub-areas to the non-volatile memory.

7. The storage system according to claim 1, wherein the non-volatile memory is NAND-type flash memory, and wherein the cache data copy unit controls which of the plurality of blocks included in the NAND-type flash memory is the LRU, and if at least one of a plurality of segments that configure a given block of the plurality of blocks is accessed then the given block is not made the LRU, and by deleting data from the LRU block, the plurality of segments that configure the block is made to be the copy address of the data.

8. The storage system according to claim 1, wherein when the access command is a write command, and if the access control unit does not find a volatile sub-area corresponding to the write address following the write command among the plurality of volatile sub-areas included in the volatile cache memory, but finds a non-volatile sub-region corresponding to the write address among the plurality of non-volatile sub-areas included in the non-volatile memory, data memorized in the found non-volatile sub-area is copied from the non-volatile sub-area to a volatile sub-area, and copied data stored in to the volatile sub-area is overwritten by the data associated with the write command.

9. The storage system according to claim 1, wherein when the access command is a read command, and if the access control unit does not find a volatile sub-area corresponding to a read source following the read command among the plurality of volatile sub-areas included in the volatile cache memory, but finds a non-volatile sub-area corresponding to the read source among the plurality of non-volatile sub-regions included in the non-volatile memory, data is read from the found non-volatile sub-area, and is sent to the upper level device.

10. The storage system according to claim 1, wherein if power is supplied from the primary power source to the volatile cache memory, the cache data copy unit specifies the volatile sub-area where clean data is stored among the plurality of volatile sub-areas included in the volatile cache memory, and copies data in the specified volatile sub-area to the non-volatile memory.

11. The storage system according to claim 10, wherein the cache data copy unit does not copy sequentially accessed data among the clean data to the non-volatile memory, and does copy randomly accessed data to the non-volatile memory.

12. The storage system according to claim 10, wherein the cache data copy unit copies data from the volatile cache memory to the non-volatile memory if (1) or (2) below applies:

(1) if there is a difference between the time when the data has been memorized in a non-volatile sub-area that memorizes clean data, which is the MRU (Most Recently Used) non-volatile sub-area among the plurality of non-volatile sub-areas included in the non-volatile memory, and the time when the data has been memorized in the volatile sub-area that memorizes clean data, which is the LRU volatile sub-region among the plurality of volatile sub-areas included in the volatile cache memory; and (2) if there is a difference greater than a specified value between the time when the data has been memorized in a non-volatile sub-area that memorizes clean data, which is the LRU non-volatile sub-area among the plurality of non-volatile sub-areas included in the non-volatile memory, and the time when the data has been memorized in the volatile sub-region that memorizes clean data, which is the LRU volatile sub-region among the plurality of volatile sub-areas included in the volatile cache memory.

13. The storage system according to claim 1, wherein the cache data copy unit conducts processing to periodically copy data from the volatile cache memory to the non-volatile memory, and every time the data copying is executed, the frequency of updating the non-volatile memory is counted, and if the update frequency exceeds a specified threshold value, the processing ends, and wherein if the update frequency is less than the specified threshold value, the processing is executed again.

14. The storage system according to claim 1,
wherein the volatile cache memory and the access control unit are included in a first access system,
wherein the first access system is one of a plurality of access systems, each of the plurality of access systems including a respective volatile cache memory and a respective access control unit,
wherein the plurality of access systems is multiplexed from the upper level device to the plurality of storage devices,
wherein each access control unit of the plurality of access systems temporarily stores data following the received access command in volatile cache memories attributed to other access systems of the plurality of access systems, and
wherein if no power is supplied from the primary power source to the volatile cache memories, the cache data copy unit uses power supplied from the battery to copy the data on each volatile cache memory to the non-volatile memory.

15. The storage system according to claim 14,
wherein in a given access system of the multiplexed plurality of access systems, if no power is supplied from the primary power source to the volatile cache memory or the volatile cache memory has failed, but power is supplied from the primary power source to the volatile cache memories in the other access systems, the access control unit of the given access system writes data following the received access command to at least one of the plurality of storage devices, or sends data read from at least one of the plurality of storage devices to the upper level device without temporarily storing the data in the volatile cache memory.

16. The storage system according to claim 1,
wherein there is cache control information expressing where access address data is stored in various volatile sub-areas of the volatile cache memory, and the access control unit updates the cache control information in the processing of the access command, and
wherein if no power is supplied from the primary power source to the volatile cache memory, in addition to the data on the volatile cache memory, the cache data copy unit copies the cache control information to the non-volatile memory; and if the power supply is restored from the primary power source to the volatile cache memory, the copied data and cache control information are read from the non-volatile memory, and the copied data is restored to the volatile cache memory.

17. The storage system according to claim 1,
wherein if power is supplied from the primary power source to the volatile cache memory, the cache data copy unit memorizes clean data among the plurality of volatile sub-areas included in the volatile cache memory and specifies the volatile sub-area that is the LRU, and copies the clean data from the specified volatile sub-area to the non-volatile memory, and
wherein if power is not supplied from the primary power source to the volatile cache memory, the cache data copy unit uses power supplied from the battery to specify a volatile sub-area where dirty data is memorized among the plurality of volatile sub-areas, and copies dirty data from the specified volatile sub-area to the non-volatile memory.

18. The storage system according to claim 17,
wherein if power is supplied from the primary power source to the volatile cache memory, the cache data copy unit counts the number of update times of the non-volatile memory, and determines whether the number of update times has exceeded a specified threshold value,
wherein if determined to have exceeded that number, the clean data memorized in the volatile cache memory is not copied to the non-volatile memory while power is supplied from the primary power source to the volatile cache memory, and
wherein if power is not supplied from the primary power source to the volatile cache memory, power supplied from the battery is used to copy the dirty data memorized in the volatile cache memory to the non-volatile memory.

19. A controller provided in a storage system that receives access commands from an upper level device and executes input/output following the access commands, comprising:
a first I/F (interface) that is a communication interface device connected to the upper level device;
a second I/F that is a communication interface device connected to a plurality of storage devices;
a volatile cache memory;
a non-volatile memory that is a type of memory that can continue to memorize data irrespective of whether or not power is supplied;
an access control unit that, when the access command received by the first I/F is a write command, temporarily memorizes the data following the write command in the volatile cache memory, and reads the memorized data from the volatile cache memory and, through the second I/F, stores the data in at least one of the plurality of storage devices,
wherein if the received access command is a read command, the access control unit reads the data following the read command from at least one of the plurality of storage devices through the second I/F, the read data is temporarily memorized in the volatile cache memory, and reads the memorized data from the volatile cache memory and sends the data to the upper level device; and
a cache data copy unit that copies data memorized in the volatile cache memory to the non-volatile memory,
wherein if no power is supplied from the primary power source to the volatile cache memory, the cache data copy unit uses power supplied from a battery, which is a secondary power source, and copies data memorized in the volatile cache memory to the non-volatile memory,
wherein when cower is supplied from the primary rower source to the volatile cache memory, the cache data copy unit specifies, from among a plurality of volatile sub-areas included in the volatile cache memory, LRU volatile sub-areas, and copies the data in the specified volatile sub-areas to the non-volatile memory.

* * * * *